US012344768B2

United States Patent
Fukuda et al.

(10) Patent No.: US 12,344,768 B2
(45) Date of Patent: Jul. 1, 2025

(54) DISPERSANT FOR POWER STORAGE DEVICE ELECTRODE

(71) Applicant: Kao Corporation, Tokyo (JP)

(72) Inventors: Taiki Fukuda, Wakayama (JP); Hideki Goto, Wakayama (JP); Akito Itoi, Wakayama (JP); Kazuo Oki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 18/724,443

(22) PCT Filed: Dec. 27, 2022

(86) PCT No.: PCT/JP2022/048420
§ 371 (c)(1),
(2) Date: Jun. 26, 2024

(87) PCT Pub. No.: WO2023/127929
PCT Pub. Date: Jul. 6, 2023

(65) Prior Publication Data
US 2025/0092271 A1 Mar. 20, 2025

(30) Foreign Application Priority Data

Dec. 27, 2021 (JP) ................. 2021-213259
Jul. 27, 2022 (JP) ................. 2022-119911

(51) Int. Cl.
| | | |
|---|---|---|
| H01B 1/24 | (2006.01) | |
| C08F 8/32 | (2006.01) | |
| C09D 5/24 | (2006.01) | |
| C09D 7/20 | (2018.01) | |
| C09D 7/40 | (2018.01) | |
| C09D 7/45 | (2018.01) | |
| C09D 7/61 | (2018.01) | |
| C09D 7/65 | (2018.01) | |
| H01M 4/60 | (2006.01) | |
| H01M 4/62 | (2006.01) | |

(52) U.S. Cl.
CPC .................. *C09D 7/45* (2018.01); *C08F 8/32* (2013.01); *C09D 5/24* (2013.01); *C09D 7/20* (2018.01); *C09D 7/61* (2018.01); *C09D 7/65* (2018.01); *C09D 7/70* (2018.01); *H01M 4/625* (2013.01); *C08F 2810/50* (2013.01)

(58) Field of Classification Search
CPC ... C09D 7/45; C09D 7/65; C09D 7/61; C09D 7/20; C09D 7/70; C09D 5/24; C08F 8/32; C08F 2810/50; H01M 4/625; H01B 1/24
See application file for complete search history.

(56) References Cited

U.S. PATENT DOCUMENTS 3,249,455 A * 5/1966 Williams ............ C09B 67/0086
516/69
4,048,422 A * 9/1977 Sackmann ............ C08L 21/00
526/272

(Continued)

FOREIGN PATENT DOCUMENTS

| JP | 41-17852 B | 10/1966 |
|---|---|---|
| JP | 2009-138115 A | 6/2009 |
| JP | 2018-168285 A | 11/2018 |

OTHER PUBLICATIONS

Surface Energy Heterogeneity Profiles of Carbon Nanotubes With a Copolymer-Modified Surface Using Surface Energy Mapping by Inverse Gas Chromatography, Gerencsér et al., Hungarian Journal of Industry and Chemisty.*
Japanese Office Action issued in Japanese Application No. 2022-210437, dated May 9, 2023.
The International Search Report (PCT/ISA/210) issued in PCT/JP2022/048420, mailed on Apr. 4, 2023.

*Primary Examiner* — Haidung D Nguyen
(74) *Attorney, Agent, or Firm* — Birch, Stewart, Kolasch & Birch, LLP

(57) ABSTRACT

An aspect of the present disclosure relates to a dispersant for an electrode of a power storage device. The dispersant contains a repeating unit represented by the following general formula (1), where a, b, and c each represent a mole fraction, provided that a+b+c=1, and b and c satisfy the relationship expressed by $0.50 < b+c \leq 1.00$ and $0.50 \leq b/b+c) \leq 0.95$. $R^4$ is preferably a branched alkyl group. $R^5$ is preferably an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group.

[Chemical Formula 1]

(1)

15 Claims, No Drawings

(56) References Cited

U.S. PATENT DOCUMENTS

2015/0028264 A1* 1/2015 Kuwahara ............ H01M 4/623
                                                      252/506
2020/0106090 A1   4/2020 Zhong et al.

* cited by examiner

DISPERSANT FOR POWER STORAGE DEVICE ELECTRODE

TECHNICAL FIELD

The present invention relates to a dispersant for an electrode of a power storage device.

BACKGROUND ART

In recent years, efforts to curb global warming have spurred the development of electric vehicles. Electric vehicles do not emit carbon dioxide, but have short mileage and long battery charging time, compared to gasoline-powered vehicles. To reduce the charging time, the rate of electron transfer in a positive electrode should be increased. At present, a carbon material is used as a conductive material for a positive electrode of a non-aqueous electrolyte battery. However, the use of the carbon material increases the viscosity of a conductive material slurry or positive electrode paste, which may lead to poor handleability. Therefore, a reduction in the viscosity of the slurry or paste is desirable. The viscosity of the slurry or paste varies greatly depending on whether the dispersibility of the carbon material is good or not.

JP S41 (1966) 17852 B (Patent Document 1) discloses a dispersant that is used to disperse carbon black in toluene or methanol. The dispersant is obtained by the reaction of a copolymer of diisobutylene and maleic anhydride with an amine compound at a reaction rate of approximately 100%.

JP 2018-168285 A (Patent Document 2) discloses a dispersant composition for printing ink. The dispersant composition contains an amidated product obtained by amidating a copolymer of diisobutylene and maleic anhydride with stearylamine at a rate of 100%, and methyl isobutyl ketone (MIBK) as an organic solvent.

JP 2009-138115 A (Patent Document 3) discloses an in oil dispersant composition for electronic materials. The in oil dispersant composition contains an amidated product obtained by amidating a copolymer of diisobutylene and maleic anhydride with oleylamine, and propylene glycol methyl ether acetate (PEGMA) as an organic solvent.

DISCLOSURE OF THE INVENTION

An aspect of the present disclosure relates to a dispersant for an electrode of a power storage device. The dispersant contains a repeating unit represented by the following general formula (1), where a, b, and c each represent a mole fraction, provided that $a+b+c=1$, and b and c satisfy the relationship expressed by $0.50 < b+c \leq 1.00$ and $0.50 \leq b/(b+c) \leq 0.95$.

In the general formula (1), $R^1$ represents hydrogen or a methyl group, $R^2$ represents hydrogen, an alkyl group with 1 to 10 carbon atoms, or an aromatic hydrocarbon group having a substituent with 1 to 10 carbon atoms or having no substituent.

$R^3$ represents an alkyl group with 16 to 22 carbon atoms,

M represents hydrogen, $NH_4$, a metal that gives a salt soluble in an organic solvent, or organic ammonium soluble in an organic solvent, $R^4$ represents an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group, and $R^5$ represents hydrogen, an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group.

An aspect of the present disclosure relates to a dispersant composition for an electrode of a power storage device. The dispersant composition contains the dispersant of the present disclosure and an organic solvent.

An aspect of the present disclosure relates to a carbon material-based conductive material slurry that contains the dispersant of the present disclosure, carbon material-based conductive materials, and an organic solvent.

An aspect of the present disclosure relates to a positive electrode paste for a power storage device. The positive electrode paste contains the dispersant of the present disclosure, carbon material-based conductive materials, a positive electrode active material, and an organic solvent.

An aspect of the present disclosure relates to a method for producing a positive electrode for a power storage device by using the positive electrode paste of the present disclosure.

An aspect of the present disclosure relates to a method for producing a power storage device by using the positive electrode of the present disclosure.

DESCRIPTION OF THE INVENTION

Patent Document 1 teaches that, as a dispersant used to disperse carbon materials in a non-aqueous solvent, a dispersant having a long chain alkyl group is particularly effective for dispersion in a nonpolar solvent, and a dispersant having a short chain alkyl group is particularly effective for dispersion in a polar solvent. On the other hand, it is desirable that the resistance of an electrode for a storage battery device be further reduced by improving the dispersibility of carbon material-based conductive materials. Under

[Chemical Formula 1]

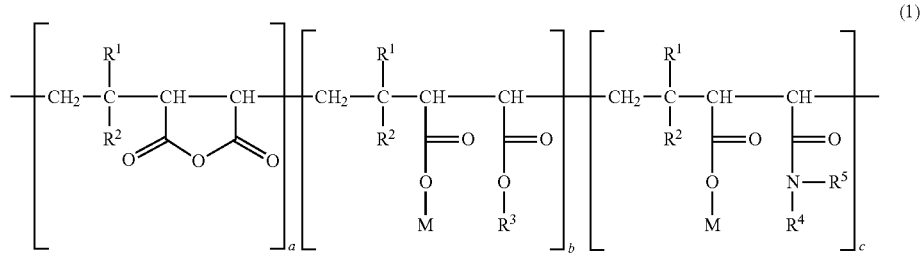

(1)

the circumstances, the dispersant having a short-chain alkyl group, which is deemed effective for the dispersion of carbon black in Patent Document 1, may lead to poor dispersibility in a polar solvent that is used to produce an electrode for a storage battery device. This problem is particularly prominent when the carbon material-based conductive materials are carbon nanotubes having a high aspect ratio.

In recent years, to form a low resistance positive electrode coating, the carbon material-based conductive materials are required to have high dispersibility in a conductive material slurry used for the preparation of a positive electrode paste. Moreover, in terms of productivity, the dispersant is also required to be highly soluble in an organic solvent (polar solvent) used for the preparation of a dispersant composition, a conductive material slurry, and a positive electrode paste, as well as to be easy to handle. Specifically, the dispersant should have good solubility in a polar solvent preferably at room temperature (25° C.) without prolonged heating.

Like Patent Document 1, Patent Document 2 and Patent Document 3 teach that the amidated product of a copolymer of diisobutylene and maleic anhydride is used as a dispersant. Patent Document 2 discloses the dispersant composition for printing ink that contains carbon black as a pigment. Patent Document 3 discloses the dispersant composition for electronic materials that contains carbon black. However, these disclosures are irrelevant to the improvement in the dispersibility of the carbon material-based conductive materials in the polar solvent that is used to produce an electrode for a storage battery device, or the improvement in the handleability.

With the foregoing in mind, in one aspect, the present disclosure provides a dispersant for an electrode of a power storage device that enables both good solubility in a polar solvent at room temperature and the preparation of a conductive material slurry containing carbon material-based conductive materials with good dispersibility. The present disclosure also provides a dispersant composition, a conductive material slurry, and a positive electrode paste, each containing the dispersant.

Moreover, the present disclosure provides a method for producing a positive electrode for a power storage device by using the positive electrode paste, and a power storage device produced by using the positive electrode for a power storage device.

The present disclosure is based on the new findings that when a dispersant for an electrode of a power storage device contains a long chain alkyl group $R^3$ with 16 to 22 carbon atoms and a spacer group with a carbon number lower than that of the long chain alkyl group $R^3$ in the side chains, it is possible to achieve both good solubility of the dispersant in an organic solvent at room temperature and the preparation of a conductive material slurry containing carbon material-based conductive materials with good dispersibility.

The details of the mechanism of the effects of the present disclosure are not fully clear, but can be assumed as follows.

The present inventors have found that a dispersant (polymer) needs to have a long-chain alkyl group with a specific chain length, i.e., with 16 to 22 carbon atoms in the side chain to exhibit excellent adsorbability on the carbon material-based conductive materials in a polar solvent that is used to produce an electrode for a storage battery device. On the other hand, the general view is that the presence of the long chain alkyl group with such a specific chain length will increase the hydrophobicity of the side chain of the polymer, and thus reduce the solubility of the polymer in the polar solvent. In the polar solvent used to produce an electrode for a storage battery device, an association structure is formed due to the hydrophobic interaction between the long chain alkyl groups, which may cause agglomeration and separation of the dispersant, so that the dispersant becomes insoluble at room temperature. However, the present inventors have also found that when a saturated hydrocarbon group $R^4$ (also referred to as a "spacer group" in the following) is introduced into the side chain of the polymer containing the repeating unit of the general formula (1), the spacer group creates a spacer effect that would inhibit the formation of the association structure between the long chain alkyl groups $R^3$ and improve the solubility of the dispersant in the polar solvent at room temperature. In this case, the saturated hydrocarbon group $R^4$ has a predetermined carbon number lower than that of the long-chain alkyl group $R^3$ and includes a saturated hydrocarbon group or a hydroxyl group.

Moreover, it is considered that the combination of the chain length of the long chain alkyl group $R^3$, the introduction of the spacer group $R^4$, and the following functions (a) to (c) of the components of the dispersant represented by the general formula (1) can achieve both high dispersion of the carbon material-based conductive materials in the polar solvent and good solubility of the dispersant in the polar solvent at room temperature.

(a) The content of the long chain alkyl group $R^3$ satisfies $0.50<b+c\leq1.00$ and $0.5023b/(b+c)\leq0.95$ in the general formula (1), resulting in high adsorbability of the dispersant on the carbon material-based conductive materials.

(b) $R^1$ and $R^2$ contribute to the solubility of the polymer in the polar solvent.

(c) Carboxy groups derived from maleic anhydride that are produced by introduction of the long chain alkyl group $R^3$, or salt structures formed by neutralization of the carboxy groups with ammonia or amines exert electrostatic repulsion and serve to improve the dispersibility of the carbon material-based conductive materials in the polar solvent.

However, the present disclosure should not be construed as being limited to these mechanisms.

In one aspect, the present disclosure can provide a dispersant for an electrode of a power storage device that enables both good solubility in an organic solvent at room temperature and the preparation of a conductive material slurry containing carbon material-based conductive materials with good dispersibility.

In one aspect, the present disclosure can provide a dispersant composition for an electrode of a power storage device that contains the dispersant of the present disclosure. Thus, the dispersant composition has good handleability and high productivity.

In one aspect, the present disclosure can provide a carbon material-based conductive material slurry that contains the dispersant of the present disclosure. Thus, the conductive material slurry makes the dispersibility of the carbon material-based conductive materials better and has high productivity. In one aspect, the present disclosure can provide a positive electrode paste for a power storage device that contains the dispersant of the present disclosure. Thus, the positive electrode paste is able to form a positive electrode coating with a low resistance value and has high productivity.

In one aspect, the present disclosure can provide a low-resistance positive electrode for a power storage device with high productivity, since the positive electrode is produced by using the positive electrode paste of the present disclosure.

In one aspect, the present disclosure can provide a low-resistance power storage device with high productivity, since the power storage device is produced by using the positive electrode of the present disclosure.

<Dispersant Composition for Electrode of Power Storage Device>

In one aspect, the present disclosure relates to a dispersant for an electrode of a power storage device such as a non-aqueous secondary battery. In one aspect, the present disclosure relates to a dispersant for an electrode of a power storage device (also referred to as a "dispersant of the present disclosure" in the following), which contains a repeating unit represented by the following general formula (1), where a, b, and c each represent a mole fraction, provided that a+b+c=1, and b and c satisfy the relationship expressed by $0.50 < b+c \leq 1.00$ and $0.50 \leq b/(b+c) \leq 0.95$.

[Chemical Formula 2]

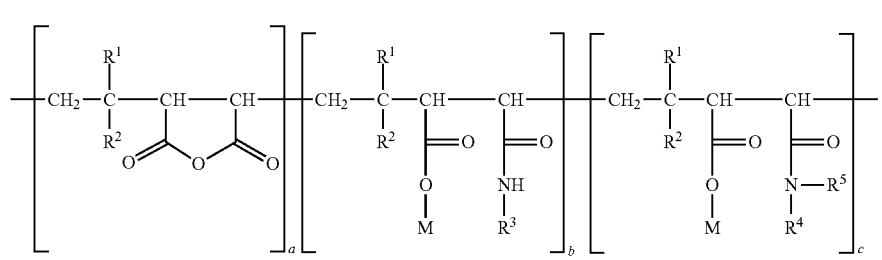

(1)

In the general formula (1), $R^1$ represents hydrogen or a methyl group, $R^2$ represents hydrogen, an alkyl group with 1 to 10 carbon atoms, or an aromatic hydrocarbon group having a substituent with 1 to 10 carbon atoms or having no substituent, $R^3$ represents an alkyl group with 16 to 22 carbon atoms, M represents hydrogen, $NH_4$, a metal that gives a salt soluble in an organic solvent, or organic ammonium soluble in an organic solvent, $R^4$ represents an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group, and $R^5$ represents hydrogen, an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group.

The repeating unit of the general formula (1) includes a constitutional unit I represented by the following general formula (2), a constitutional unit II represented by the following general formula (3), and a constitutional unit II represented by the following general formula (4).

[Chemical Formula 3]

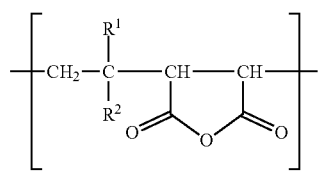

(2)

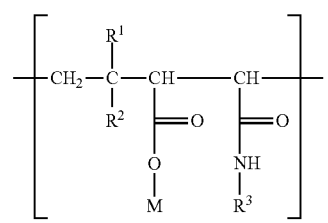

(3)

-continued

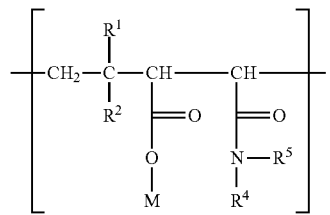

(4)

All of the constitutional unit I, the constitutional unit II, and the constitutional unit III include a unit represented by the following general formula (5). This unit is a component that is responsible for solubility in the organic solvent. M in the constitutional units II and II is a component that contributes to the dispersion of the carbon material-based conductive materials in the organic solvent. $R^3$ in the constitutional unit II is a hydrophobic group that functions as an anchoring group to the carbon material-based conductive materials.

[Chemical Formula 4]

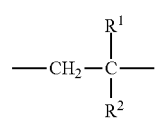

(5)

$R^3$ has a high adsorption ability on the carbon material-based conductive materials. However, since $R^3$ is a long chain alkyl group with 16 to 22 carbon atoms, the hydrophobic interaction between the long chain alkyl groups forms an association structure, which may cause agglomeration and separation of the dispersant, making the dispersant less soluble in the organic solvent. In view of this, the dispersant of the present disclosure contains the constitutional unit II of the general formula (4) that has at least one spacer group with a carbon number lower than that of the long chain alkyl groups $R^3$ in the side chain. Therefore, the spacer effect of the spacer group will inhibit the formation of the association structure between the long chain alkyl groups and improve the solubility of the dispersant in the organic solvent. Moreover, the dispersant of the present disclosure contains the constitutional units I and II (adsorption units) and the constitutional unit I (spacer unit) so as to satisfy the relationship expressed by $0.50<b+c\le1.00$ and $0.50\le b(b+c)\le0.95$. This configuration can achieve both good solubility of the dispersant in the organic solvent at room temperature and good dispersibility of the carbon material-based conductive materials in the organic solvent.

The dispersant of the present disclosure is highly soluble in the organic solvent at room temperature. Thus, the dispersant does not need to be heated to dissolve and can maintain the dissolved state at room temperature. The use of the dispersant of the present disclosure can provide a dispersant composition for an electrode of a power storage device with good handleability and high productivity.

The dispersant of the present disclosure has high solubility in the organic solvent at room temperature and high adsorbability on the carbon material-based conductive materials. The use of the dispersant of the present disclosure can provide a conductive material slurry that makes the dispersibility of the carbon material-based conductive materials better and has high productivity. The use of the dispersant of the present disclosure can also provide a positive electrode paste that is able to form a positive electrode coating with a low resistance value and has high productivity. Therefore, the production method of a positive electrode for a power storage device by using a positive electrode coating composed of the positive electrode paste of the present disclosure can reduce the resistance and improve the productivity of the positive electrode. Moreover, the production method of a power storage device by using the positive electrode of the present disclosure can reduce the resistance and improve the productivity of the power storage device.

The dispersant of the present disclosure is obtained by amidation of a copolymer of an olefin and maleic anhydride to form an amidated product, and optionally by neutralization of the amidated product. The unit of the general formula (5) is derived from an olefin. In the dispersant of the present disclosure, a unit represented by the following general formula (6) derived from maleic anhydride is amidated to introduce the long chain alkyl group $R^3$ and the spacer group. The spacer group is represented by $R^4$ or both $R^4$ and $R^5$ in the general formula (4).

[Chemical Formula 5]

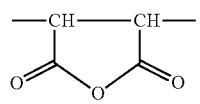
(6)

The following general formula (7) is obtained by amidation of the unit of the general formula (6) to introduce the long chain alkyl group $R^3$, and optionally by neutralization of a carboxy group. A unit represented by the following general formula (8) is obtained, e.g., by amidation of the unit of the general formula (6) to introduce $R^4$ or both $R^4$ and $R^5$ as a spacer group, and optionally by neutralization of a carboxy group.

[Chemical Formula 6]

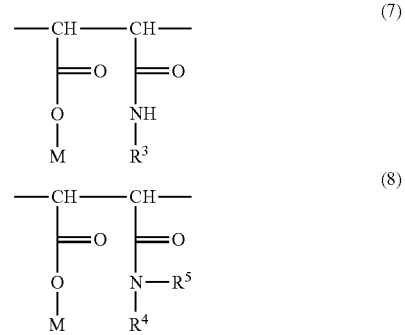

The arrangement of the constitutional units I to II in the repeating unit of the general formula (1) may be either a block sequence or a random sequence, but the random sequence is preferred from the viewpoint of the spacer effect of the spacer group.

Each of the constitutional units I, II, and III in the repeating unit of the general formula (1) may be one type or a combination of two or more types.

$R^1$ in the constitutional units I, II, and III represents hydrogen or a methyl group, and preferably represents a methyl group from the viewpoint of solubility in the organic solvent.

$R^2$ in the constitutional units I, II, and III represents hydrogen, an alkyl group with 1 to 10 carbon atoms, or an aromatic hydrocarbon group having a substituent with 1 to 10 carbon atoms or having no substituent, preferably represents an alkyl group with 1 to 10 carbon atoms or an aromatic hydrocarbon group having a substituent with 1 to 10 carbon atoms or having no substituent, more preferably represents an alkyl group with 1 to 10 carbon atoms or a naphthyl or phenyl group having a substituent with 1 to 10 carbon atoms or having no substituent, and further preferably represents an alkyl group with 1 to 10 carbon atoms from the viewpoint of solubility in the organic solvent. The alkyl group may be either linear or branched.

The carbon number of $R^2$ is 1 or more, and preferably 2 or more from the viewpoint of the adsorbability of the dispersant on the carbon material-based conductive materials, ease of synthesis of the dispersant, and the availability of monomers From the same viewpoint, the carbon number of $R^2$ is 10 or less, and preferably 7 or less.

$R^3$ in the constitutional unit II represents an alkyl group with 16 to 22 carbon atoms. The carbon number of $R^3$ is 16 or more, and preferably 18 or more from the viewpoint of the adsorbability of the dispersant on the carbon material-based conductive materials. Furthermore, the carbon number of $R^3$ is 22 or less, and preferably 20 or less from the viewpoint of availability and the solubility of the dispersant at room temperature.

The spacer group $R^4$ in the constitutional unit II represents an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group. In order to inhibit the formation of the association structure due to the hydrophobic interaction between the long chain alkyl groups $R^3$, $R^4$ preferably represents a short-chain alkyl group, a saturated hydrocarbon group including an alicyclic hydrocarbon group, or a saturated hydrocarbon group having a hydroxyl group, each of which has a carbon number lower than that of the long chain alkyl group $R^3$, and more preferably represents a branched-chain alkyl group that is bulkier than a linear-chain alkyl group and is highly functional as a spacer, the saturated hydrocarbon group including an alicyclic hydrocarbon group, or the saturated hydrocarbon group having a hydroxyl group.

The carbon number of the spacer group $R^4$ is 1 or more, and preferably 2 or more from the viewpoint of inhibiting the formation of the association structure. Furthermore, the carbon number of the spacer group $R^4$ is 12 or less, preferably 11 or less, and more preferably 10 or less from the viewpoint of availability and ease of synthesis of the dispersant. The number of hydroxyl groups of the spacer group $R^4$ is preferably 1 or more in terms of solubility, and is also preferably 2 or less, and more preferably 1 or less in terms of reactivity. The position of the hydroxyl group of the spacer group $R^4$ is preferably at the end of the spacer group from the viewpoint of solubility and availability.

$R^5$ in the constitutional unit III represents hydrogen, an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group. $R^5$ preferably represents an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group from the viewpoint of the spacer effect. Specifically, in the constitutional unit III, a tertiary amide structure in which both $R^4$ and $R^5$ are spacer groups is bulkier than a secondary amide structure in which $R^4$ is a spacer group and $R^5$ is hydrogen. Therefore, the solubility of the dispersant in the organic solvent at room temperature may be better when $R^5$ is an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group than when $R^5$ is hydrogen. The carbon number of $R^5$ is 1 or more, and preferably 2 or more from the viewpoint of inhibiting the formation of the association structure. Furthermore, the carbon number of $R^5$ is 12 or less, preferably 11 or less, and more preferably 10 or less from the viewpoint of availability and ease of synthesis of the dispersant. The number of hydroxyl groups of the spacer group $R^5$ is preferably 1 or more in terms of solubility, and is also preferably 2 or less, and more preferably 1 or less in terms of reactivity. The position of the hydroxyl group of the spacer group $R^5$ is preferably at the end of the spacer group from the viewpoint of solubility and availability.

In the dispersant of the present disclosure, from the viewpoint of the solubility of the dispersant in the organic solvent at room temperature, the carboxy groups that are produced during the introduction of $R^3$, $R^4$, and $R^5$ into the general formula (6) may not be neutralized, or some or all of the carboxy groups may be neutralized. From the viewpoint of the dispersibility of the dispersant in the organic solvent, M in the constitutional units II and II is, e.g., hydrogen when the carboxy groups are not neutralized. Alternatively, M is, e.g., $NH_4$, a metal that gives a salt soluble in the organic solvent, or organic ammonium derived from an organic amine soluble in the organic solvent when some or all of the carboxy groups are neutralized. M is preferably hydrogen Examples of the metal include Na, Ca, and Mg. Examples of the neutralizer that provides these structures include ammonia, an organic amine B1, and alkali metal hydroxides such as sodium hydroxide and potassium hydroxide.

The organic amine B1 may be any amine compound that functions as a neutralizer. Specific examples of the organic amine B1 include the following: methylamine (SP value (solubility parameter): 8.85 $(cal/cm^3)^{1/2}$, boiling point: $-6.3°$ C., this also applies to the values in the parentheses below); dimethylamine (7.80, 7° C.); ethylamine (7.93, 16.6° C.); dimethylbenzylamine (9.1, 180° C.); methylbenzylamine (9.8, 186° C.); 2-N-dibutylaminoethanol (10.0, 226° C.); 1-phenylmethanamine (10.5, 184° C.); N,N-diethylaminoethanol (10.7, 162° C.); 2-dimethylaminoethanol (11.3, 134° C.); 1-amino-2-butanol (11.9, 169° C.); 2-(ethylamino) ethanol (12.0, 169° C.); 2-amino-2-methyl-1-propanol (12.2, 185° C.); DL-1-amino-2-propanol (12.4, 160° C.); N-methyl-2-aminoethanol (12.5, 175° C.); 1-(2-hydroxyethyl) piperazine (12.98, 246° C.); and N-ethyldiethanolamine (13.4, 251° C.).

The SP value has been defined based on the development of the regular solution theory, and used as an indicator of the solubility of a compound. In the present disclosure, the SP value is determined by the Fedors calculation method, which is one of the methods to estimate a solubility parameter from a molecular structure. The details of the Fedors calculation method are described in POLYMER ENGINEERING AND SCIENCE, February 1974, vol. 14, No. 2 "A Method for Estimating Both the Solubility Parameters and Molar Volumes of Liquids."

The dispersant of the present disclosure is obtained by amidating the copolymer of an olefin and maleic anhydride, and optionally neutralizing the amidated product. As described above, a, b, and c in the general formula (1) each represent a mole fraction, provided that a+b+c=1. The sum (b+c) of the mole fraction b of the constitutional unit II and the mole fraction c of the constitutional unit III is referred to as an amidation rate or a modification rate, provided that a+b+c=1. The mole fraction b of the constitutional unit II is a modification rate for the constitutional unit II. The mole fraction c of the constitutional unit II is a modification rate for the constitutional unit III. The relationship expressed by 0.50<b+c≤1.00 means that the amidation rate with respect to maleic anhydride is more than 50 mol % when b+c is more than 0.50, and that the amidation rate with respect to maleic anhydride is 100 mol % when b+c is 1.00.

In the dispersant of the present disclosure, the modification rate b is preferably 0.50 or more, more preferably 0.55 or more, and further preferably 0.60 or more from the viewpoint of the adsorbability of the dispersant on the carbon material-based conductive materials. Furthermore, the modification rate b is preferably 0.95 or less, more preferably 0.90 or less, even more preferably 0.85 or less, and further preferably 0.80 or less from the viewpoint of improving the solubility of the dispersant in the organic solvent at room temperature.

In the present disclosure, the modification rate b can be calculated from the amount of an amine compound having an alkyl group $R^3$ with 16 to 22 carbon atoms, which is used for the synthesis of the dispersant.

In the dispersant of the present disclosure, the modification rate c is preferably 0.50 or less, more preferably 0.45 or less, and further preferably 0.40 or less from the viewpoint of improving the solubility of the dispersant in the organic solvent at room temperature. Furthermore, the modification rate c is preferably 0.10 or more, more preferably 0.15 or more, and further preferably 0.20 or more from the viewpoint of improving the solubility of the dispersant in the organic solvent.

In the present disclosure, the modification rate c can be calculated from the amount of an amine compound having $R^4$ and $R^5$, which is used for the synthesis of the dispersant.

In the dispersant of the present disclosure, the modification rate b+c is more than 0.50, preferably 0.55 or more, more preferably 0.65 or more, even more preferably 0.70 or more, still more preferably 0.75 or more, and further preferably 1.00 from the viewpoint of the adsorbability of the dispersant on the carbon material-based conductive materials. The dispersant of the present disclosure may be one type or a mixture of two or more types selected from dispersants with a modification rate b+c of more than 0.50 and 1.00 or less.

In the present disclosure, the modification rate b+c can be calculated from the total amount of the amine compound having $R^3$ and the amine compound having $R^4$ and $R^5$, which are used for the synthesis of the dispersant.

In the dispersant of the present disclosure, b/(b+c) is 0.50 or more, preferably 0.55 or more, and more preferably 0.60 or more from the viewpoint of the adsorbability of the dispersant on the carbon material-based conductive materials. Furthermore, b/(b+c) is 0.95 or less, preferably 0.90 or less, more preferably 0.85 or less, and further preferably 0.80 or less from the viewpoint of the solubility of the dispersant at room temperature. The dispersant of the present disclosure may be a combination of two or more dispersants with different b/(b+c) values.

In the present disclosure, b/(b+c) can be calculated from the amount of an amine compound (as will be described later) used for polymerization to produce the dispersant.

The dispersant of the present disclosure is a modified copolymer obtained by amidation of a copolymer of an olefin and maleic anhydride to form an amidated product, and optionally by neutralization of the amidated product. The weight average molecular weight of the copolymer of an olefin and maleic anhydride before the amidation is preferably 3000 or more, more preferably 5000 or more, and further preferably 10000 or more from the viewpoint of the adsorbability of the dispersant on the carbon material-based conductive materials. Furthermore, the weight average molecular weight of the copolymer is preferably 100000 or less, more preferably 70000 or less, and further preferably 50000 or less from the viewpoint of the solubility of the dispersant in the organic solvent, the dispersibility of the carbon material-based conductive materials, and a reduction in the viscosity of the slurry. In the present disclosure, the weight average molecular weight of the copolymer of an olefin and maleic anhydride before the amidation is a value measured by GPC (gel permeation chromatography), and the details of the measurement conditions will be described in [Measurement of weight average molecular weight of polymer] in Examples.

A monomer that provides the unit of the general formula (5) (also referred to as a "monomer I" in the following) is preferably at least one selected from the group consisting of α-olefins having 2 to 13 carbon atoms from the viewpoint of good solubility in the organic solvent. Example of the monomer I include diisobutylene, isobutylene, 1-pentene, 1-heptene, 1-butene, 1-octene, 1-decene, styrene, and α-methyl styrene. Among them, the monomer I is preferably at least one of diisobutylene (2,4,4-trimethylpentene-1) or isobutylene, and more preferably diisobutylene (2,4,4-trimethylpentene-1) from the viewpoint of good solubility in the organic solvent.

A monomer that provides the unit of the general formula (6) (also referred to as a "monomer II" in the following) is preferably maleic anhydride with a reactive structure such as acid anhydride because the alkyl groups $R^3$, $R^4$, and $R^5$ can easily be introduced.

The dispersant of the present disclosure may be produced by, e.g., a method used for polymerization of vinyl monomers. For example, the monomer I and the monomer II are mixed in a solvent and polymerized to form a copolymer by solution polymerization. Then, the amine compound having $R^4$ and $R^5$ is further added so that $R^4$ and $R^5$ are introduced into some of the units derived from the monomer I. Subsequently, the amine compound having an alkyl group $R^3$ with 16 to 22 carbon atoms is added so that the alkyl group $R^3$ with 16 to 22 carbon atoms is introduced into some or all of the residual units derived from the monomer II, in which $R^4$ and $R^5$ have not been introduced.

Moreover, a neutralizer is added as needed to the solution containing the modified copolymer thus obtained to neutralize some or all of the carboxylic acids. Thereafter, the solvent in the solution containing the modified copolymer is replaced with an aqueous solvent, if necessary. As a result of the solvent replacement, the modified copolymer precipitates out of the solution, and the dispersant of the present disclosure is provided.

Examples of the amine compound for introducing the alkyl group $R^3$ with 16 to 22 carbon atoms include cetylamine, 1-aminoheptadecane, stearylamine, 1-aminononadecane, icosylamine, and behenylamine.

Examples of the amine compound for introducing $R^4$ and $R^5$ include isobutylamine, tert-butylamine, n-butylamine, isohexylamine, 2-ethylhexylamine, isooctylamine, n-octylamine, n-butylamine, isodecylamine, diethylamine, dibutylamine, dicyclohexylamine, ethanolamine, N-methylethanolamine, N-ethylethanolamine, 2-amino-1 propanol, 2-amino-2-methyl-1-propanol, 1-amino-2-propanol, 2-amino-1,3-propanediol, and diethanolamine.

Examples of the solvent used for the synthesis of the dispersant include organic solvents such as hydrocarbons (hexane and heptane), aromatic hydrocarbons (toluene, xylene, etc.), ketones (acetone, methyl ethyl ketone, and methyl isobutyl ketone), ethers (tetrahydrofuran and diethylene glycol dimethyl ether), and N-methylpyrrolidone. The amount of the solvent is preferably 0.5 to 10 times the total amount of the monomers in terms of mass ratio.

The polymerization initiator used for the above polymerization may be any known radical polymerization initiator. Examples of the polymerization initiator include azo polymerization initiators, hydroperoxides, dialkyl peroxides, diacyl peroxides, and ketone peroxides. The amount of the polymerization initiator is preferably 0.01 to 5 mol % with respect to the total amount of the monomer components. The polymerization reaction is preferably performed at a temperature of 40 to 180° C. under a nitrogen flow, and the reaction time is preferably 0.5 to 20 hours. Moreover, any known chain transfer agent may be used in the above polymerization. Examples of the chain transfer agent include isopropyl alcohol and a mercapto compound such as mercaptoethanol <Dispersant Composition for Electrode of Power Storage Device>

The dispersant of the present disclosure may be brought to the market in the form of either the polymer containing a repeating unit represented by the general formula (1) or a dispersant composition for an electrode of a power storage device (also referred to as a "dispersant composition" for brevity in the following) which has been obtained by dissolving the dispersant of the present disclosure in an organic solvent (also referred to as an "organic solvent C" for the sake of convenience in the following).

The dispersant of the present disclosure is highly soluble in the organic solvent at room temperature. Thus, the dispersant does not need to be heated to dissolve and can maintain the dissolved state at room temperature. Therefore, the dispersant composition of the present disclosure has good handleability.

The content of the dispersant in the dispersant composition of the present disclosure is not particularly limited and is preferably 10% by mass or more, more preferably 15% by mass or more, and further preferably 20% by mass or more from the viewpoint of productivity. Furthermore, the content of dispersant is preferably 50% by mass or less, more preferably 45% by mass or less, and further preferably 40% by mass or less from the viewpoint of the solubility of the dispersant in the organic solvent at room temperature.

In one aspect, the dispersant composition of the present disclosure preferably contains an organic amine soluble in the organic solvent (also referred to as an "organic amine B2" to distinguish it from the organic amine B1 used for the synthesis of the dispersant) from the viewpoint of the effect of reducing the viscosities of the conductive material slurry and the positive electrode paste, and also from the viewpoint of reducing the direct current resistance of a power storage device. The organic amine B2 is preferably an amine compound with an SP value of 9.5 $(cal/cm^3)^{1/2}$ or more and 14.0 $(cal/cm^3)^{1/2}$ or less from the viewpoint of reducing the direct current resistance of the power storage device. Moreover, the organic amine B2 preferably has a boiling point of 260° C. or less from the viewpoint of reducing the residual amine that would be present in the electrode.

The SP value of the organic amine B2 of the present disclosure is preferably 9.5 $(cal/cm^3)^{1/2}$ or more, more preferably 10.5 $(cal/cm^3)^{1/2}$ or more, and further preferably 11.0 $(cal/cm^3)^{1/2}$ or more from the viewpoint of reducing the direct current resistance of the power storage device. From the same viewpoint, the SP value of the organic amine B2 is preferably 14.0 $(cal/cm^3)^{1/2}$ or less, more preferably 13.5 $(cal/cm^3)^{1/2}$ or less, and further preferably 13.0 $(cal/cm^3)^{1/2}$ or less.

The boiling point of the organic amine B2 of the present disclosure is preferably 260° C. or less. From the viewpoint of reducing the resistance of an electrode of a power storage device, the boiling point of the organic amine B2 is preferably a temperature at which the organic amine B2 evaporates during drying in the production process of the electrode, more preferably not more than the boiling point (202° C.) of N-methylpyrrolidone (NMP), which is often used as a solvent of the positive electrode paste, and further preferably 190° C. or less for recycling of NMP. The lower limit of the boiling point of the organic amine B2 of the present disclosure is preferably 100° C. or more, and more preferably 120° C. or more from the viewpoint of ease of handling.

Preferred examples of the organic amine B2 of the present disclosure include the amine compounds that are listed as the preferred examples of the organic amine BI and have an SP value of 9.5 $(cal/cm^3)^{1/2}$ or more and 14.0 $(cal/cm^3)^{1/2}$ or less from the viewpoint of reducing the direct current resistance of the power storage device, and also have a boiling point of 260° C. or less. Among the amine compounds, the organic amine B2 is preferably at least one selected from the group consisting of 2-amino-2-methyl-1-propanol, 2-N-dibutylaminoethanol, 1-phenylmethanamine, 2-dimethylaminoethanol, N-methyl-2-aminoethanol, and N-ethyldiethanolamine, more preferably at least one selected from the group consisting of 2-dimethylaminoethanol, 2-amino-2-methyl-1-propanol, and N-methyl-2-aminoethanol, and particularly preferably 2-amino-2-methyl-1-propanol from the viewpoint of reducing the direct current resistance of the power storage device.

In one or more embodiments, the content of the organic amine B2 in the dispersant composition of the present disclosure is preferably 10 parts by mass or more, more preferably 20 parts by mass or more, even more preferably 30 parts by mass or more, still more preferably 50 parts by mass or more, and further preferably 70 parts by mass or more with respect to 100 parts by mass of the dispersant of the present disclosure from the viewpoint of the effect of reducing the viscosities of the conductive material slurry and the positive electrode paste, and also from the viewpoint of reducing the direct current resistance of the power storage device. Furthermore, the content of the organic amine B2 is preferably 300 parts by mass or less, more preferably 250 parts by mass or less, even more preferably 200 parts by mass or less, and further preferably 150 parts by mass or less with respect to 100 parts by mass of the dispersant from the viewpoint of the solubility of the dispersant.

The mass ratio (dispersant/organic amine B2) of the dispersant to the organic amine B2 in the dispersant composition of the present disclosure is preferably 0.1 or more, more preferably 0.3 or more, even more preferably 0.5 or more, and further preferably 0.8 or more from the viewpoint of improving the dispersibility of the conductive materials. Furthermore, the mass ratio is preferably 10 or less, more preferably 5 or less, and further preferably 3 or less from the viewpoint of high conductive properties.

[Organic Solvent]

Examples of the organic solvent C include the following: amide based polar organic solvents such as dimethylformamide (DMF), diethylformamide, dimethylacetamide (DMAc), and N-methylpyrrolidone (NMP); ketone-based polar organic solvents such as methyl ethyl ketone (MIEK) and methyl isobutyl ketone (MIBK); and ester based polar organic solvents such as ethyl acetate, γ-butyrolactone, and ε-caprolactone. The organic solvent C may be one type or a combination of two or more types of these organic solvents.

Specifically, the organic solvent C is preferably at least one selected from the group consisting of dimethylformamide (DMF), diethylformamide, dimethylacetamide (DMAc), N-methylpyrrolidone (NMP), methyl ethyl ketone (MEK), methyl isobutyl ketone (MIBK), ethyl acetate, γ-butyrolactone, and ε-caprolactone, more preferably includes N-methylpyrrolidone with high solubility, and is further preferably N-methylpyrrolidone.

The dispersant composition of the present disclosure may further contain other components to the extent that they do not interfere with the effects of the present disclosure. The other components include, e.g., an antioxidant, a neutralizer, an antifoaming agent, an antiseptic, a dehydrating agent, an anticorrosive agent, a plasticizer, and a binder.

<Carbon Material-Based Conductive Material Slurry>

In one aspect, the present disclosure relates to a carbon material-based conductive material slurry (also referred to as a "conductive material slurry of the present disclosure" in the following). The conductive material slurry of the present disclosure contains carbon material-based conductive materials, the dispersant of the present disclosure, and an organic solvent, and optionally the organic amine B2. In this aspect, the preferred embodiments of the dispersant of the present disclosure are as described above. The organic solvent in this aspect is preferably the same as the organic solvent C, and more preferably NMP. The conductive material slurry of the present disclosure contains the dispersant of the present disclosure and therefore has a low viscosity. This also allows the carbon material-based conductive materials dispersed in the conductive material slurry to have a small particle size and good dispersibility.

[Carbon Material-Based Conductive Material]

In one or more embodiments, examples of the carbon material-based conductive materials include carbon nanotubes (also referred to as "CNTs" in the following), carbon black, graphite, and graphene. Among them, the carbon material-based conductive materials are preferably at least one selected from carbon black or carbon nanotubes, and more preferably carbon nanotubes from the viewpoint of achieving high conductive properties. The carbon material-based conductive materials may be one type or a combination of two or more types.

(CNT)

The average diameter of CNTs that can be used as the carbon material-based conductive materials is not particularly limited and is preferably 2 nm or more, more preferably 3 nm or more, and further preferably 5 nm or more from the viewpoint of improving the dispersibility of the CNTs. Furthermore, the average diameter of the CNTs is preferably 100 nm or less, more preferably 70 nm or less, and further preferably 50 nm or less from the viewpoint of improving the conductive properties. In the present disclosure, the average diameter of the CNTs may be measured with a scanning electron microscope (SEM) or an atomic force microscope (AFM).

The CNTs that can be used as the carbon material-based conductive materials may include two or more types with different diameters in order to achieve both the conductive properties and the dispersibility. When the CNTs are of two or more types with different diameters, the average diameter of the relatively thin CNTs is preferably 2 nm or more, more preferably 3 nm or more, and further preferably 5 nm or more from the viewpoint of the dispersibility. Furthermore, the average diameter of the relatively thin CNTs is preferably 29 nm or less, more preferably 25 nm or less, and further preferably 20 nm or less from the viewpoint of the conductive properties. On the other hand, the average diameter of the relatively thick CNTs is preferably 30 nm or more, more preferably 35 nm or more, and further preferably 40 nm or more from the viewpoint of the dispersibility. Furthermore, the average diameter of the relatively thick CNTs is preferably 100 nm or less, more preferably 70 nm or less, and further preferably 50 nm or less from the viewpoint of improving the conductive properties.

The average length of the CNTs may be measured with a scanning electron microscope (SEM) or an atomic force microscope (AFM). In the present disclosure, the average length of the CNTs is not particularly limited and is preferably 2 μm or more, more preferably 5 μm or more, even more preferably 10 μm or more, and further preferably 30 μm or more from the viewpoint of improving the conductive properties. Furthermore, the average length of the CNTs is preferably 500 μm or less, more preferably 300 μm or less, even more preferably 200 μm or less, and further preferably 120 μm or less from the viewpoint of improving the dispersibility.

The CNTs of the present disclosure mean the whole of a plurality of types of CNTs. The form of the CNTs used for the preparation of the conductive material slurry is not particularly limited. For example, a plurality of types of CNTs may be present independently or may be bundled or entangled with each other. Alternatively, these forms of CNTs may be combined together. The CNTs may have various number of layers or various diameters. The CNTs may contain impurities (such as a catalyst and amorphous carbon) derived from the process of producing the CNTs.

The content of impurities in the CNTs may be measured by, e.g., thermogravimetric analysis. In the present disclosure, the content of impurities is preferably as small as possible. The content of impurities in the CNTs is preferably 40% by mass or less, more preferably 30% by mass or less, even more preferably 20% by mass or less, still more preferably 10% by mass or less, and further preferably substantially 0% by mass from the viewpoint of increasing the concentration of the effective CNTs.

In one or more embodiments, each of the CNTs that can be used as the carbon material-based conductive materials is a single sheet of graphite rolled into a cylinder. The CNTs include a single-walled carbon nanotube (SWCNT) consisting of a single layer of graphite, a double walled carbon nanotube (DWCNT) consisting of two layers of graphite, and a multi-walled carbon nanotube (MWCNT) consisting of three or more layers of graphite. Any of the single, double, and multi-walled CNTs and a mixture of them can be used depending on the properties required for a positive electrode coating, which is formed by using the positive electrode paste for a power storage device that contains a CNT slurry. The positive electrode coating is a film-like layer obtained by applying the positive electrode paste to an electrode substrate (current collector).

Examples of the CNTs that can be used as the carbon material-based conductive materials include the following: NC-7000 (9.5 nm: hereinafter, the number in parentheses indicates the average diameter) and NX7100 (10 nm) manufactured by Nanocyl SA; FT6100 (9 nm), FT-6110 (9 nm), FT-6120 (9 nm), FT-7000 (9 nm), FT-7010 (9 nm), FT-7320 (9 nm), FT-9000 (12.5 nm), FT-9100 (12.5 nm), FT-9110 (12.5 nm), FT-9200 (19 nm), and FT-9220 (19 nm) manufactured by Jiangsu Cnano Technology Ltd.; HCNTs4 (4.5 nm), CNTs5 (7.5 nm), HCNTs5 (7.5 nm), GCNTs5 (7.5 nm), HCNTs10 (15 nm), CNTs20 (25 nm), and CNTs40 (40 nm) manufactured by Cabot Performance Materials (Shenzhen) Co., Ltd; CTUBE 170 (13.5 nm), CTUBE 199 (8 nm), and CTUBE 298 (10 nm) manufactured by Korea CNT Co., Ltd.; K-Nanos 100P (11.5 nm) manufactured by Korea Kumho Petrochemical Co., Ltd.; CP-1001M (12.5 nm) and BT-1003M (12.5 nm) manufactured by LG Chem; and 3003 (10 nm) and 3021 (20 nm) manufactured by Nano-Tech Port Co., Ltd.

Examples of the combination of two types of CNTs include the following: a combination of CNTs40 (40 nm) and HCNTs4 (4.5 nm) or HCNTs5 (7.5 nm) from Cabot Performance Materials (Shenzhen) Co., Ltd; a combination of CNTs40 (40 nm) and GCNTs5 (7.5 nm) from Cabot Performance Materials (Shenzhen) Co., Ltd.; a combination of CNTs40 (40 nm) and FT-7010 (9 nm) from Jiangsu Cnano Technology Ltd., a combination of CNTs40 (40 nm) and FT-9100 (12.5 nm) from Jiangsu Cnano Technology Ltd.; and a combination of CNTs40 (40 nm) and BT-1003M (12.5 nm) from LG Chem.

(Carbon Black)

Various types of carbon black, including furnace black, channel black, thermal black, acetylene black (AB), and Ketjen black, can be used as the carbon material-based conductive materials. In addition, common oxidized carbon black and hollow carbon can also be used. The oxidation of carbon is carried out in such a manner that carbon is treated at a high temperature in the air or secondarily treated with, e.g., nitric acid, nitrogen dioxide, or ozone, so that oxygen-containing polar functional groups such as phenol, quinone, carboxy, and carbonyl groups are directly introduced (covalently bonded) to the surface of the carbon. This treatment is typically performed to improve the dispersibility of carbon. However, in general, the larger the amount of the functional groups introduced, the lower the conductive properties of carbon. Therefore, carbon that has not been subjected to the oxidation treatment is preferably used.

As the specific surface area of the carbon black that can be used as the carbon material-based conductive materials becomes larger, the points of contact between carbon black particles are increased, which is advantageous in reducing the internal resistance of an electrode. Specifically, the specific surface area (BET) is determined from the amount of nitrogen adsorption, and is preferably 20 $m^2/g$ or more and 1500 $m^2/g$ or less.

The primary particle size (diameter) of the carbon black that can be used as the carbon material-based conductive materials is preferably 5 to 1000 nm from the viewpoint of the conductive properties. In the present disclosure, the primary particle size of the carbon black is the average of the particle sizes measured with, e.g., an electron microscope.

Examples of the carbon black that can be used as the carbon material-based conductive materials include, but are not limited to, the following: TOKABLACK #4300, #4400, #4500, #5500, etc. (manufactured by TOKAI CARBON CO., LTD., furnace black); Printex L etc. (manufactured by Degussa AG, furnace black); Raven 7000, 5750, 5250, 5000 Ultra II, 5000 Ultra, etc. and Conductex SC Ultra, Conductex 975 Ultra, etc. (manufactured by Columbian Chemicals Co., furnace black); #2350, #2400B, #30050B, #3030B, #3230B, #3350B, #3400B, #5400B, etc. (manufactured by Mitsubishi Chemical Corporation, furnace black); MONARCH 1400, 1300, and 900, VULCAN XC-72R, BLACK PEARLS 2000, etc. (manufactured by Cabot Corporation, furnace black); ENSACO 250G. ENSACO 260G, ENSACO 350G, and SUPER P-Li (manufactured by TIMCAL Ltd.); Ketjen black EC-300J and EC-600JD (manufactured by Akzo Co., Ltd.); and DENKA BLACK, DENKA BLACK HS-100, FX-35, Li-100, Li-250, Li-400, and Li-435 (manufactured by Denka Company Limited, acetylene black).
(Graphene)

The graphene that can be used as the carbon material-based conductive materials generally refers to a sheet of $sp^2$-bonded carbon atoms with a thickness of one atom (i.e., single-layer graphene). In the present disclosure, the graphene also includes a flaky substance having a layered structure of single-layer graphene sheets.

The thickness of the graphene that can be used as the carbon material-based conductive materials is not particularly limited and is preferably 100 nm or less, more preferably 50 nm or less, and further preferably 20 nm or less. The size of a graphene sheet in the direction parallel to the graphene layer is not particularly limited. However, a conductive path per graphene becomes shorter when the graphene is too small. This may lead to poor conductive properties due to the influence of contact resistance between graphene sheets. Therefore, the graphene of the present disclosure is preferably larger than a certain degree. The size of a graphene sheet in the direction parallel to the graphene layer is preferably 0.5 μm or more, more preferably 0.7 μm or more, and further preferably 1 μm or more. In this case, the size of a graphene sheet in the direction parallel to the graphene layer means the average of the maximum diameter and the minimum diameter of the graphene sheet when observed in the direction perpendicular to the plane direction of the graphene sheet.
(Content of Carbon Material-Based Conductive Material in Conductive Material Slurry)

The content of the carbon material-based conductive materials in the conductive material slurry of the present disclosure is preferably 0.1% by mass or more, more preferably 0.5% by mass or more, and further preferably 1% by mass or more from the viewpoint of improving the convenience of adjusting the concentration of the positive electrode paste. Furthermore, the content of the carbon material-based conductive materials is preferably 10% by mass or less, more preferably 8% by mass or less, and further preferably 5% by mass or less from the viewpoint of making the viscosity of the conductive material slurry suitable for easy handling.
(Content of Dispersant in Conductive Material Slurry)

The content of the dispersant in the conductive material slurry of the present disclosure is preferably 0.01% by mass or more, more preferably 0.05% by mass or more, even more preferably 0.08% by mass or more, and further preferably 0.15% by mass or more from the viewpoint of improving the dispersibility of the carbon material-based conductive materials. Furthermore, the content of the dispersant is preferably 2.0% by mass or less, more preferably 1.5% by mass or less, even more preferably 1.2% by mass or less, and further preferably 1.0% by mass or less from the viewpoint of high conductive properties.

The content of the dispersant in the conductive material slurry of the present disclosure is preferably 0.1 part by mass or more, more preferably 1 part by mass or more, even more preferably 5 parts by mass or more, and further preferably 10 parts by mass or more with respect to 100 parts by mass of the carbon material-based conductive materials from the viewpoint of improving the dispersibility of the carbon material-based conductive materials. Furthermore, the content of the dispersant is preferably 200 parts by mass or less, more preferably 150 parts by mass or less, even more preferably 90 parts by mass or less, and further preferably 75 parts by mass or less with respect to 100 parts by mass of the carbon material-based conductive materials from the viewpoint of high conductive properties.
(Content of Organic Amine B2 in Conductive Material Slurry)

The content of the organic amine B2 in the conductive material slurry of the present disclosure is preferably 0.01% by mass or more, more preferably 0.05% by mass or more, even more preferably 0.1% by mass or more, and further preferably 0.2% by mass or more from the viewpoint of improving the dispersibility of the carbon material-based conductive materials and reducing the resistance of the power storage device. Furthermore, the content of the organic amine B2 is preferably 2.0% by mass or less, more preferably 1.5% by mass or less, even more preferably 1.0% by mass or less, and further preferably 0.8% by mass or less from the viewpoint of high conductive properties.

The content of the organic amine B2 in the conductive material slurry of the present disclosure is preferably 1 part by mass or more, more preferably 5 parts by mass or more, even more preferably 10 parts by mass or more, and further preferably 15 parts by mass or more with respect to 100 parts by mass of the carbon material-based conductive materials from the viewpoint of improving the dispersibility of the carbon material-based conductive materials and reducing the resistance of the power storage device. Furthermore, the content of the organic amine B2 is preferably 200 parts by mass or less, more preferably 100 parts by mass or less, and further preferably 50 parts by mass or less with respect to 100 parts by mass of the carbon material-based conductive materials from the viewpoint of high conductive properties.
(Production Method of Conductive Material Slurry)

In one or more embodiments, the conductive material slurry of the present disclosure may be prepared by mixing a mixture of the dispersant of the present disclosure, the carbon material-based conductive materials, and the organic solvent, and optionally an additional organic amine B2, with a mixing and dispersing machine. In one or more embodiments, the conductive material slurry of the present disclosure may be prepared by mixing a mixture of the dispersant composition of the present disclosure and the carbon material-based conductive materials, and optionally an additional organic solvent or the organic amine B2, with a mixing and dispersing machine.

The mixing and dispersing machine may be at least one selected from, e.g., an ultrasonic homogenizer, a vibration mill, a jet mill, a ball mill, a bead mill, a sand mil, a roll mil, a homogenizer, a high-pressure homogenizer, an ultrasonic device, an attritor, a dissolver, or a paint shaker. Some of the components of the conductive material slurry may be mixed first, and then the mixture may be blended with the remainder. Moreover, all the components of the conductive material slurry do not have to be added at once, but may be divided and added multiple times. The dispersant of the present disclosure may be dissolved in the organic solvent to form a dispersant composition, and then the dispersant composition may be mixed with other components such as the carbon material-based conductive materials. The carbon material-based conductive materials may be in a dry state or in a dispersed state in a solvent. This solvent may be the same as the organic solvent C described above.

<Positive Electrode Paste for Power Storage Device>

In one aspect, the present disclosure relates to a positive electrode paste for a power storage device (also referred to as a "positive electrode paste of the present disclosure" in the following). The positive electrode paste of the present disclosure contains the dispersant of the present disclosure, carbon material-based conductive materials, a positive electrode active material, and an organic solvent, and optionally the organic amine B2. In this aspect, the preferred embodiments of the dispersant of the present disclosure are as described above. The organic solvent in this aspect is preferably the same as the organic solvent C, and more preferably NMP. The positive electrode paste of the present disclosure contains the dispersant of the present disclosure and therefore enables the formation of a positive electrode coating with a low resistance value.

The positive electrode paste of the present disclosure may further contain a binder. In one or more embodiments, the positive electrode paste of the present disclosure may further contain conductive materials other than the carbon material-based conductive materials. The conductive materials other than the carbon material-based conductive materials include, e.g., conductive polymers such as polyaniline.

(Positive Electrode Active Material)

The positive electrode active material may be any inorganic compound such as a compound with an olivine structure or a lithium transition metal composite oxide. Examples of the compound with an olivine structure include compounds represented by the general formula $Li_xM1_sPO_4$ (where M1 represents a 3d transition metal, $0 \leq x \leq 2$, and $0.8 \leq s \leq 1.2$). The compound with an olivine structure may be coated with, e.g., amorphous carbon. Examples of the lithium transition metal composite oxide include a lithium manganese oxide with a spinel structure and a lithium transition metal composite oxide that has a layered structure and is represented by the general formula $Li_xMO_{2-\delta}$ (where M represents a transition metal, $0.4 \leq x \leq 1.2$, and $0 \leq \delta \leq 0.5$). The transition metal M may be, e.g., Co, Ni, or Mn. The lithium transition metal composite oxide may further contain one or more than one element selected from Al, Mn, Fe, Ni, Co, Cr, Ti, Zn, P, or B.

The content of the positive electrode active material in the positive electrode paste of the present disclosure is not particularly limited as long as it can be adjusted in accordance with a suitable viscosity of the positive electrode paste that is applied to a current collector. The content of the positive electrode active material is preferably 40% by mass or more, more preferably 50% by mass or more, and further preferably 60% by mass or more from the viewpoint of energy density and the stability of the positive electrode paste. From the same viewpoint, the content of the positive electrode active material is preferably 90% by mass or less, more preferably 85% by mass or less, and further preferably 80% by mass or less.

The content of the positive electrode active material in the total solid content of the positive electrode paste of the present disclosure is not particularly limited and may be the same as that of a positive electrode active material in the total solid content of a conventionally known positive electrode paste. The content of the positive electrode active material in the total solid content of the positive electrode paste of the present disclosure is preferably 90.0% by mass or more in order to maintain the energy density of the power storage device at a high level, and is also preferably 99.9% by mass or less in order to ensure the conductive properties and coating properties of a composite layer.

(Binder)

The binder (binder resin) may be, e.g., polyvinylidene fluoride (PVDF), a vinylidene fluoride-hexafluoropropylene copolymer, styrene butadiene rubber, or polyacrylonitrile. These materials may be used alone or in combination of two or more.

The content of the binder in the total solid content of the positive electrode paste of the present disclosure is preferably 0.05% by mass or more from the viewpoint of the coating properties of the composite layer and the binding properties of the composite layer to a current collector. Furthermore, the content of the binder is preferably 9.95% by mass or less from the viewpoint of maintaining the energy density of the power storage device at a high level.

(Content of Dispersant in Positive Electrode Paste)

The content of the dispersant in the positive electrode paste of the present disclosure is preferably 0.01% by mass or more, and more preferably 0.02% by mass or more from the viewpoint of coating resistance. From the same viewpoint, the content of the dispersant is preferably 2.0% by mass or less, and more preferably 1.0% by mass or less.

(Content of Organic Amine B2 in Positive Electrode Paste)

The content of the organic amine B2 in the positive electrode paste of the present disclosure is preferably 0.005% by mass or more, more preferably 0.012% by mass or more, and further preferably 0.02% by mass or more from the viewpoint of increasing the solid content concentration of the positive electrode paste and reducing the viscosity of the positive electrode paste. Furthermore, the content of the organic amine B2 is preferably 0.2% by mass or less, more preferably 0.1% by mass or less, and further preferably 0.05% by mass or less from the viewpoint of solubility in the solvent and the stability of the positive electrode paste.

(Content of Carbon Material-Based Conductive Material in Positive Electrode Paste)

The content of the carbon material-based conductive materials in the positive electrode paste of the present disclosure is preferably 0.01% by mass or more, more preferably 0.05% by mass or more, and further preferably 0.1% by mass or more from the viewpoint of the conducive properties of the composite layer. Furthermore, the content of the carbon material-based conductive materials is preferably 5% by mass or less, more preferably 3% by mass or less, and further preferably 2% by mass or less from the viewpoint of maintaining the energy density of the power storage device at a high level.

In one or more embodiments, the positive electrode paste of the present disclosure may be prepared by mixing, e.g., the positive electrode active material, the conductive material slurry of the present disclosure, the binder, the organic amine B2, and an organic solvent (additional solvent) for adjusting the solid content concentration or the like, and then stirring the mixture. In addition, the mixture may further contain a dispersant other than the dispersant of the present disclosure or a functional material. The organic solvent (additional solvent) is preferably the organic solvent C, and more preferably NMP. The mixing and stirring processes can be performed using, e.g., a planetary mixer, a bead mill, or a jet mill either alone or in combination.

The positive electrode paste of the present disclosure may also be prepared by premixing some of the components that are used to prepare the positive electrode paste, and then blending the mixture with the remainder. Moreover, all the components of the positive electrode paste do not have to be added at once, but may be divided and added multiple times. This can reduce the mechanical load on the stirring device.

The solid content concentration of the positive electrode paste of the present disclosure, the amount of the positive electrode active material, the amount of the binder, the amount of the conductive material slurry, the amount of the additive components, and the amount of the organic solvent can be adjusted in accordance with a suitable viscosity of the positive electrode paste that is applied to a current collector. The amount of the organic solvent is preferably as small as possible in terms of drying properties. However, the viscosity of the positive electrode paste should not be too high from the viewpoint of the uniformity and surface smoothness of a positive electrode composite layer. On the other hand, the viscosity of the positive electrode paste should not be too low from the viewpoint of preventing drying and ensuring a sufficient thickness of the composite layer (positive electrode coating).

It is preferable that the positive electrode paste of the present disclosure can be adjusted to a high concentration from the viewpoint of production efficiency. However, a significant increase in the viscosity of the positive electrode paste is not preferred in terms of workability. The use of additives can maintain a suitable viscosity range while keeping a high concentration of the positive electrode paste.

Each of the conductive material slurry and the positive electrode paste of the present disclosure may further contain other components to the extent that they do not interfere with the effects of the present disclosure. The other components include, e.g., an antioxidant, a neutralizer, an antifoaming agent, an antiseptic, a dehydrating agent, an anticorrosive agent, a plasticizer, and a binder.

(Production Method of Positive Electrode Paste)

In one or more embodiments, a method for producing a positive electrode paste of the present disclosure may include mixing the carbon material-based conductive material slurry of the present disclosure, the binder, and the positive electrode active material, and optionally an additional organic solvent or the organic amine B2. In one or more embodiments, the method may further include mixing an additional dispersant composition of the present disclosure and additional carbon material-based conductive materials, if necessary. These components may be mixed in any order. In one or more embodiments, the positive electrode paste may also be produced in the following manner. The conductive material slurry of the present disclosure, the additional organic solvent, and the binder are mixed and dispersed until the mixture becomes homogeneous. Then, this mixture is blended with the positive electrode active material and stirred until it becomes homogeneous. The order of adding the components is not limited to the above.

<Production Method of Positive Electrode Coating or Positive Electrode for Power Storage Device>

In one aspect, the present disclosure relates to a method for producing a positive electrode coating or a positive electrode for a power storage device by using the positive electrode paste of the present disclosure. The method in this aspect includes applying the positive electrode paste of the present disclosure to a current collector, and then drying and pressing the applied positive electrode paste. In this aspect, the preferred embodiments of the positive electrode paste of the present disclosure are as described above. In the production method of the present disclosure, the positive electrode coating or the positive electrode for a power storage device can be produced by a conventionally known method except for the use of the positive electrode paste of the present disclosure.

The positive electrode coating or the positive electrode for a power storage device may be produced by, e.g., applying the positive electrode paste to a current collector such as aluminum foil, and then drying the positive electrode paste. The applied positive electrode paste may also be subjected to compaction with a pressing machine to increase the density of the positive electrode coating. The positive electrode paste may be applied with, e.g., a die head, a comma reverse roll, a direct roll, or a gravure roll. The applied positive electrode paste may be dried by, e.g., heating, airflow, or infrared radiation, which may be used alone or in combination. The drying is performed at a temperature at which the organic solvent in the positive electrode paste evaporates and cannot be present in the positive electrode paste as the drying time passes. The drying temperature is not particularly limited as long as it is equal to or lower than the thermal decomposition temperature of the binder resin in the environment (under atmospheric pressure or vacuum) in which the drying is performed. The drying temperature is preferably equal to or higher than the boiling point of the organic solvent. Specifically, the drying temperature is preferably 60° C. or more and 220° C. or less, and the drying time is preferably 10 minutes or more and 24 hours or less. The positive electrode can be pressed with, e.g., a roll press machine. After pressing the positive electrode, it may be processed to a size suitable for fitting into a power storage device, and then dried again under the conditions described above.

<Power Storage Device and Production Method Thereof>

In one aspect, the present disclosure relates to a power storage device that includes a positive electrode obtained by the production method of a positive electrode for a power storage device of the present disclosure, and also relates to a method for producing the power storage device.

In one or more embodiments, examples of the power storage device include a lithium ion secondary battery, a lithium-air secondary battery, a sodium ion battery, a sodium-sulfur secondary battery, a sodium nickel chloride secondary battery, an organic radical battery, a zinc air secondary battery, and an all-solid-state battery.

The production method of a power storage device of the present disclosure includes the same steps as those of a known production method of a power storage device except for the use of the positive electrode of the present disclosure. For example, the production method of the present disclosure includes the following steps: stacking two electrodes (positive electrode and negative electrode) via a separator to form a layered body and winding the layered body or laminating two or more layered bodies according to the shape of a battery, and placing the wound electrode body or the laminated electrode body thus obtained in a battery container or a laminated container, putting an electrolyte solution into the container, and sealing the container.

The present disclosure further discloses a dispersant for an electrode of a power storage device, a dispersant composition for an electrode of a power storage device, a carbon material-based conductive material slurry, a positive electrode paste for a power storage device, and a method for producing a positive electrode for a power storage device as follows.

<1> A dispersant for an electrode of a power storage device, comprising: a repeating unit represented by the following general formula (1), where a, b, and c each represent a mole fraction, provided that a+b+c=1, and b and c satisfy the relationship expressed by $0.50 < b+c \leq 1.00$ and $0.50 \leq b/(b+c) \leq 0.95$:

[Chemical Formula 7]

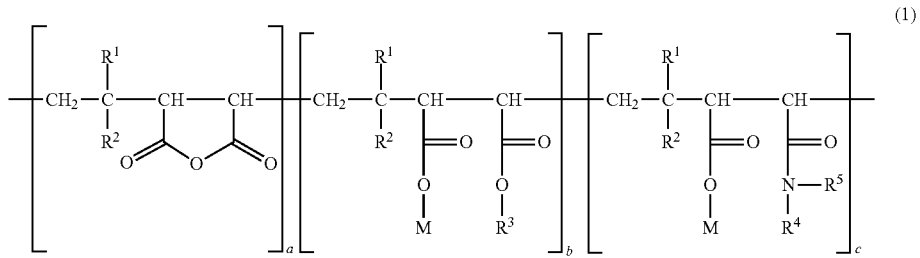

(1)

in the general formula (1), $R^1$ represents hydrogen or a methyl group, $R^2$ represents hydrogen, an alkyl group with 1 to 10 carbon atoms, or an aromatic hydrocarbon group having a substituent with 1 to 10 carbon atoms or having no substituent, $R^3$ represents an alkyl group with 16 to 22 carbon atoms, M represents hydrogen, $NH_4$, a metal that gives a salt soluble in an organic solvent, or organic ammonium soluble in an organic solvent, $R^4$ represents an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group, and $R^5$ represents hydrogen, an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group.

<2> A dispersant for an electrode of a power storage device, comprising: a repeating unit represented by the following general formula (1), where a, b, and c each represent a mole fraction, provided that a+b+c=1, and b and c satisfy the relationship expressed by 0.50<b+c≤1.00 and 0.50≤b/(b+c)≤0.95:

in the general formula (1), $R^1$ represents hydrogen or a methyl group, $R^2$ represents hydrogen, an alkyl group with 1 to 10 carbon atoms, or a naphthyl or phenyl group having a substituent with 1 to 10 carbon atoms or having no substituent, $R^3$ represents an alkyl group with 16 to 22 carbon atoms, M represents hydrogen, $NH_4$, a metal that gives a salt soluble in an organic solvent, or organic ammonium soluble in an organic solvent, $R^4$ represents an alkyl group with 1 to 10 carbon atoms, a saturated hydrocarbon group with 1 to 10 carbon atoms that includes an alicyclic hydrocarbon group, or a saturated hydrocarbon group with 1 to 10 carbon atoms that has a hydroxyl group, and $R^5$ represents hydrogen, an alkyl group with 1 to 10 carbon atoms, a saturated hydrocarbon group with 1 to 10 carbon atoms that includes an alicyclic hydrocarbon group, or a saturated hydrocarbon group with 1 to 10 carbon atoms that has a hydroxyl group.

<3> A dispersant for an electrode of a power storage device, comprising: a repeating unit represented by the following general formula (1), where a, b, and c each represent a mole fraction, provided that a+b+c=1, and b and c satisfy the relationship expressed by 0.50<b+c≤1.00 and 0.50≤b/(b+c)≤0.95:

[Chemical Formula 8]

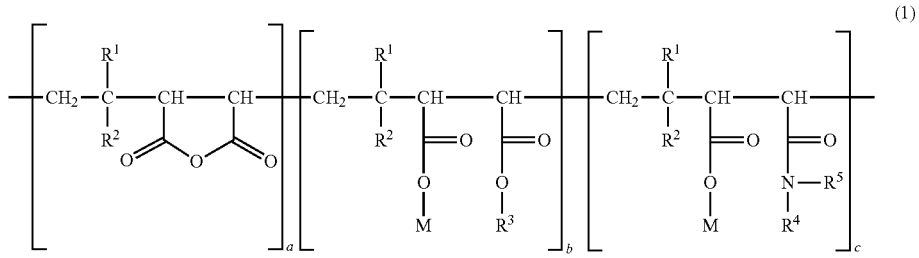

(1)

[Chemical Formula 9]

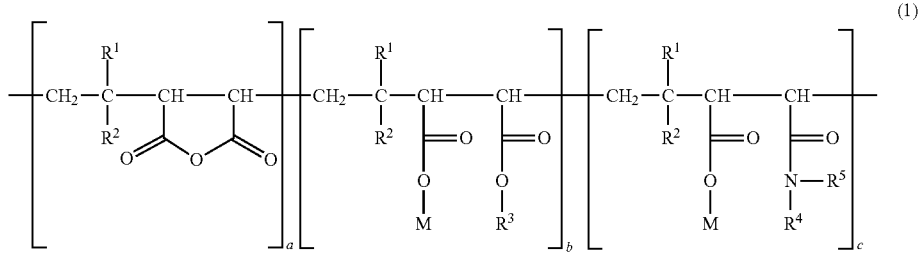

in the general formula (1), $R^1$ represents a methyl group, $R^2$ represents an alkyl group with 1 to 10 carbon atoms, $R^3$ represents an alkyl group with 16 to 22 carbon atoms, M represents hydrogen, $NH_4$, a metal that gives a salt soluble in an organic solvent, or organic ammonium soluble in an organic solvent, $R^4$ represents an alkyl group with 1 to 10 carbon atoms, a saturated hydrocarbon group with 1 to 10 carbon atoms that includes an alicyclic hydrocarbon group, or a saturated hydrocarbon group with 1 to 10 carbon atoms that has a hydroxyl group, and $R^5$ represents hydrogen, an alkyl group with 1 to 10 carbon atoms, a saturated hydrocarbon group with 1 to 10 carbon atoms that includes an alicyclic hydrocarbon group, or a saturated hydrocarbon group with 1 to 10 carbon atoms that has a hydroxyl group.

<4> The dispersant according to any one of <1> to <3>, wherein b+c is 0.70 or more.

<5> The dispersant according to any one of <1> to <4>, wherein b/(b+c) is 0.60 or more and 0.90 or less.

<6> A dispersant composition for an electrode of a power storage device, comprising: the dispersant according to any one of <1> to <5>; and an organic solvent.

<7> A dispersant composition for an electrode of a power storage device, comprising: the dispersant according to any one of <1> to <5>; an organic solvent; and an organic amine B2 soluble in the organic solvent, wherein the organic amine B2 is at least one selected from the group consisting of 2-amino-2-methyl-1-propanol, 2-N-dibutylaminoethanol, 1-phenylmethanamine, 2-dimethylaminoethanol, N-methyl-2-aminoethanol, and N-ethyldiethanolamine.

<8> The dispersant composition according to <6> or <7>, wherein a content of the dispersant is 10% by mass or more and 40% by mass or less.

<9> The dispersant composition according to any one of <6> to <8>, wherein a mass ratio (dispersant/organic amine B2) of the dispersant to the organic amine B2 is 0.5 or more and 5 or less.

<10> A carbon material-based conductive material slurry comprising: the dispersant composition according to any one of <6> to <9>; and carbon material-based conductive materials.

<11> The carbon material-based conductive material slurry according to <10>, wherein a content of the dispersant is 0.1 part by mass or more and 200 parts by mass or less with respect to 100 parts by mass of the carbon material-based conductive materials.

12 The carbon material-based conductive material slurry according to <10> or <11>, wherein a content of the organic amine B2 is 1 part by mass or more and 200 parts by mass or less with respect to 100 parts by mass of the carbon material-based conductive materials.

<13> A positive electrode paste for a power storage device, comprising: the dispersant composition according to any one of <6> to <9>; a positive electrode active material; and carbon material-based conductive materials.

<14> A method for producing a positive electrode for a power storage device by using the positive electrode paste according to <13>.

<15> A method for producing a power storage device by using a positive electrode for a power storage device that is produced by the method according to <14>.

<16> Use of the dispersant composition according to any one of <6> to <9> for production of a carbon material-based conductive material slurry.

<17> Use of the dispersant composition according to any one of <6> to <9> for production of a positive electrode paste for a power storage device.

EXAMPLES

Hereinafter, Examples of the present disclosure and Comparative Examples will be described, but the present disclosure is not limited to the following examples.

1. Measurement Method of Each Parameter

[Measurement of Weight Average Molecular Weight]

The weight average molecular weight of a copolymer before amidation was measured by a GPC method. The detailed conditions are as follows.

Measuring device: HLC-8320 GPC (manufactured by Tosoh Corporation)
Column: α–M+α–M (manufactured by Tosoh Corporation)
Column temperature: 40° C.
Detector: differential refractometer
Eluent: N,N-dimethylformamide (DMF) solution containing 60 mmol/L of $H_3PO_4$ and 50 mmol/L of LiBr
Flow rate: 1 ml/min
Standard sample used for calibration curve: polystyrene
Sample solution: DMF solution containing 0.5 wt % of solid content of copolymer
Amount of sample solution injected: 100 μL

[Solubility of Dispersant in Organic Solvent]

The solubility of dispersants A-1 to A-21, as shown in Table 1, in a solvent was determined under the following conditions.

First, an organic solvent (NMP), which was the same as the organic solvent used in the preparation of a conductive material slurry, and the dispersant were placed in a flask, and stirred at room temperature for 5 hours with a rotational speed of 200 rpm. Then, the mixture was allowed to stand for 1 hour, so that a dispersant composition with a dispersant concentration of 20% by mass was prepared. The appearance of the dispersant composition was visually observed, and the solubility of the dispersant in the organic solvent at 25° C. was evaluated in accordance with the following criteria. Table 2 shows the results.

A: The dispersant composition was homogeneous and transparent.
B: The dispersant composition was slightly turbid.
C: The dispersant composition was generally cloudy, but the dispersant was uniformly dispersed.

D: The dispersant settled and was insoluble in the solvent, or the dispersant composition was separated into two layers: a gel layer of the dissolved dispersant and a layer consisting of the organic solvent.

[Measurement of Viscosity of Conductive Material Slurry]

The viscosity (25° C.) of the conductive material slurry was measured in the following manner. Using a rheometer MCR 302 (manufactured by Anton Paar GmbH) equipped with a parallel plate PP50, the shear rate was increased from 0.1 s$^{-1}$ to 1000 s$^{-1}$ (forward sweep) and then returned from 1000 s$^{-1}$ to 0.1 s$^{-1}$ (backward sweep), and the viscosity at a shear rate of 1 s$^{-1}$ in the backward sweep was determined. Tables 3 and 6 show the results.

[Measurement of Particle Size of Dispersed CNT]

The conductive material slurry diluted about 50 times with NMP was placed in a glass cell, and the particle size of the dispersed CNTs was measured at 25° C. with a particle size analyzer "Zetasizer Nano-S" (manufactured by Malvern Panalytical Ltd.). Tables 3 and 6 show the results.

[Measurement of Resistance Value of Positive Electrode Coating]

The positive electrode paste was dropped on a polyester film and applied uniformly to the polyester film with a 100 μm applicator. The coated polyester film was dried at 80° C. for 1 hour. Thus, a positive electrode coating with a thickness of 40 μm was provided.

The coating resistance value of the positive electrode coating was measured at a limiting voltage of 10 V by using Loresta GP (manufactured by Mitsubishi Chemical Analytech Co., Ltd.) equipped with a PSP probe. Table 4 shows the results.

[Measurement of Direct Current Resistance (DCR)]

A power storage device was produced by the following procedure to measure direct current resistance.

The positive electrode paste was applied to a piece of Al foil (current collector) with a thickness of 20 μm so that the positive electrode capacity was 3 mAh/cm$^2$. Then, the positive electrode paste was vacuum dried at 100° C. for 12 hours with a vacuum dryer, resulting in an electrode material (positive electrode material) that included a current collector and a composite layer disposed on the current collector. This positive electrode material was punched to a diameter of 13 mm and pressed to form an electrode (positive electrode). Next, a separator with a diameter of 19 mm and coin-shaped metallic lithium with a diameter of 15 mm and a thickness of 0.5 mm were placed on the positive electrode. Thus, a 2032 type coin cell (test half cell) was produced. The electrolyte solution was 1M LiPF$_6$ in EC/DEC (volume ratio=3/7).

A 3-cycle charge-discharge test was performed on the test half cells thus produced under the following charge-discharge conditions, where the temperature of each cell was controlled at 30° C. in a thermostat.

(Charge-Discharge Conditions)

30° C., 0.2 C, charge 4.45 V CC/CV 1/10 C cutoff, discharge CC 3.0 V cutoff

Next, each of the test half cells was charged at 0.2 C for 2.5 hours, and then direct current resistance (DCR) was calculated from a voltage drop for 10 seconds when the cell was discharged at 0.2 to 8 C. Table 8 shows the results.

2. Synthesis of Dispersant

Example 1-1

In a 1 L four-necked separable glass flask were placed 94.2 g of a styrene/maleic anhydride copolymer (manufactured by Polyscope Polymers, XIRAN (registered trademark) 1000, weight average molecular weight: 5000) and 276.2 g of methyl isobutyl ketone (MIBK) (manufactured by FUJIFILM Wako Pure Chemical Corporation), and this solution was stirred for a predetermined time (0.5 hour) in a nitrogen atmosphere. Moreover, 18.1 g of 2-ethylhexylamine (manufactured by FUJIFILM Wako Pure Chemical Corporation) was added dropwise to the flask at room temperature over 0.5 hour. Next, 87.8 g of stearylamine (manufactured by FUJIFILM Wako Pure Chemical Corporation) was added to the flask at room temperature, and then the temperature of the reaction solution in the flask was increased to about 72° C. and held for 2 hours. Thus, a polymer solution was obtained. The solvent was allowed to evaporate from the polymer solution, thereby providing a dispersant A-1 (100% modified product) that was a polymer represented by the general formula (1), where R$^1$ was H, R$^2$ was C$_6$H$_5$, R$^3$ was C$_{18}$H$_{37}$, R$^4$ was i-C$_8$H$_{17}$, R$^5$ was H, M was H, b+c was 1.00, and b/b+c was 0.70.

Example 1-2

A glass reaction vessel equipped with an agitator, a thermometer, a reflux condenser, a nitrogen introduction tube, and a dropping funnel was used. The reaction vessel was charged with 621.8 g of diisobutylene (manufactured by Maruzen Petrochemical Co., Ltd.) and 3.1 g of Lutonal A-50 (manufactured by BASF, polyvinyl ethyl ether). The inside of the reaction vessel was filled with a nitrogen atmosphere, and stirring was started. The contents in the reaction vessel were heated to 105° C. and maintained at this temperature until the polymerization reaction was completed. Then, 190.0 g of liquid maleic anhydride (manufactured by MITSUI CHEMICALS POLYURETHANES, INC.) which was kept warm at 70° C., and an initiator solution in which 9.2 g of PERBUTYL O (manufactured by NOF CORPORATION, polymerization initiator, t-butyl peroxy-2-ethylhexanoate, "PERBUTYL" (registered trademark)) was dissolved in 23.1 g of diisobutylene were added dropwise from different dropping funnels to the reaction vessel over 4 hours. After 20 minutes from the end of the dropping, 1.2 g of PERBUTYL O dissolved in 7.3 g of diisobutylene was added to the reaction vessel, and the mixture was further aged for 2 hours and 40 minutes to complete the polymerization reaction, resulting in a solution containing the copolymer. Subsequently, 800 g of ion-exchanged water was added to the reaction vessel so that the copolymer precipitated out of the solution. Next, unreacted diisobutylene was distilled off by steam distillation, where the reaction vessel was heated under normal pressure, and the temperature of the contents in the reaction vessel reached 100° C. The steam distillation was continued until no more distillate of diisobutylene was collected Next, water was removed by decantation, and then the copolymer precipitates wetted with water were dried at 105° C. for 24 hours under a reduced pressure of 100 mmHg. Thus, a diisobutylene/maleic anhydride copolymer a with a weight average molecular weight of 28000 was obtained.

In a 1 L four-necked separable glass flask were placed 95.7 g of the diisobutylene/maleic anhydride copolymer a (weight average molecular weight: 28000) thus obtained and 276.2 g of methyl isobutyl ketone (MIBK) (manufactured by FUJIFILM Wako Pure Chemical Corporation), and this solution was stirred for a predetermined time (0.5 hour) in a nitrogen atmosphere. Moreover, 17.8 g of 2-ethylhexylamine (manufactured by FUJIFILM Wako Pure Chemical Corporation) was added dropwise to the flask at room temperature over 0.5 hour. Next, 86.5 g of stearylamine (manufactured by FUJIFILM Wako Pure Chemical Corporation) was added to the flask at room temperature, and then the temperature of the reaction solution in the flask was increased to about 72° C. and held for 2 hours. Thus, a polymer solution was obtained. The solvent was allowed to evaporate from the polymer solution, thereby providing a dispersant A-2 (100% modified product) that was a polymer represented by the general formula (1), where R$^1$ was CH$_3$, $R^2$ was i-$C_6H_{11}$, $R^3$ was $C_{18}H_{37}$, $R^4$ was i-$C_8H_{17}$, $R^5$ was H, M was H, b+c was 1.00, and b/b+c was 0.70.

Examples 1-3 to 1-8, Comparative Example 1-1

Dispersants A-3 to A-8 and A-17, each having the composition shown in Table 1, were prepared in the same manner as Example 1-2, except that the amounts of 2-ethylhexylamine and stearylamine added were changed, and the values b+c and b/b+c were changed.

Example 1-9

A dispersant A-9 having the composition shown in Table 1 was prepared in the same manner as Example 1-2, except that tert-butylamine was used instead of 2-ethylhexylamine.

Example 1-10

A dispersant A-10 having the composition shown in Table 1 was prepared in the same manner as Example 1-2, except that diethylamine was used instead of 2-ethylhexylamine.

Example 1-11

A dispersant A-11 having the composition shown in Table 1 was prepared in the same manner as Example 1-2, except that dibutylamine was used instead of 2-ethylhexylamine.

Example 1-12

A dispersant A-12 having the composition shown in Table 1 was prepared in the same manner as Example 1-2, except that dicyclohexylamine was used instead of 2-ethylhexylamine.

Example 1-13

A dispersant A-13 having the composition shown in Table 1 was prepared in the same manner as Example 1-2, except that behenylamine was used instead of stearylamine.

Example 1-14

A dispersant A-14 having the composition shown in Table 1 was prepared in the same manner as Example 1-2, except that n-octylamine was used instead of 2-ethylhexylamine.

Example 1-15

A dispersant A-15 having the composition shown in Table 1 was prepared in the same manner as Example 1-2, except that n-butylamine was used instead of 2-ethylhexylamine.

Example 1-16

A dispersant A-16 having the composition shown in Table 1 was prepared in the same manner as Example 1-2, except that 2-amino-2-methyl-1-propanol was used instead of 2-ethylhexylamine.

Example 1-17

A diisobutylene/maleic anhydride copolymer b with a weight average molecular weight of 9000 was obtained by performing the same operation as that in the synthesis of the copolymer a in Example 1-2, except that 15.3 g of PER-BUTYL O (manufactured by NOF CORPORATION, polymerization initiator, t-butyl peroxy-2-ethylhexancate) was dissolved in 23.1 g of diisobutylene (manufactured by Maruzen Petrochemical Co., Ltd.) as an initiator solution. A dispersant A-19 having the composition shown in Table 1 was prepared in the same manner as Example 1-2, except that the copolymer b (weight average molecular weight; 9000) was used instead of the copolymer a, and the amounts of 2-ethylhexylamine and stearylamine added were changed.

Example 1-18

A diisobutylene/maleic anhydride copolymer c with a weight average molecular weight of 6000 was obtained by performing the same operation as that in the synthesis of the copolymer a in Example 1-2, except that 17.4 g of PER-BUTYL O (manufactured by NOF CORPORATION, polymerization initiator, t-butyl peroxy-2-ethylhexanoate) was dissolved in 23.1 g of diisobutylene (manufactured by Maruzen Petrochemical Co., Ltd.) as an initiator solution. A dispersant A-20 having the composition shown in Table 1 was prepared in the same manner as Example 1-2, except that the copolymer c (weight average molecular weight: 6000) was used instead of the copolymer a, and the amounts of 2-ethylhexylamine and stearylamine added were changed.

Example 1-19

In a 1 L four-necked separable glass flask were placed 19.49 g of ISOBAM 04 (manufactured by Kuraray Co., Ltd., isobutylene/maleic anhydride copolymer, weight average molecular weight: 60000) and 450.00 g of tetrahydrofuran (THF) (manufactured by FUJIFILM Wako Pure Chemical Corporation), and this solution was stirred for a predetermined time (0.5 hour) in a nitrogen atmosphere. Moreover, 3.27 g of 2-ethylhexylamine (manufactured by FUJIFILM Wako Pure Chemical Corporation) was added dropwise to the flask at room temperature over 0.5 hour. Next, 27.25 g of stearylamine (manufactured by FUJIFILM Wako Pure Chemical Corporation) was added to the flask at room temperature, and then the temperature of the reaction solution in the flask was increased to about 50° C. and held for 2 hours. Thus, a polymer solution was obtained. The solvent was allowed to evaporate from the polymer solution, thereby providing a dispersant A-21 (100% modified product) that was a polymer represented by the general formula (1), where $R^1$ was $CH_3$, $R^2$ was $CH_3$, $R^3$ was $C_{18}H_{37}$, $R^4$ was i-$C_8H_{17}$, $R^5$ was H, M was H, b+c was 1.00, and b/b+c was 0.80.

Comparative Example 1-2

A dispersant A-18 having the composition shown in Table 1 was prepared in the same manner as Example 1-2, except that no stearylamine was added.

TABLE 1

| | Dispersant | $R^1$ | $R^2$ | $R^3$ | $R^4$ | $R^5$ | M | b + c | b/b + c | Mw |
|---|---|---|---|---|---|---|---|---|---|---|
| Ex. 1-1 | A-1 | H | $C_6H_5$ | $C_{18}H_{37}$ | i-$C_8H_{17}$ | H | H | 1.00 | 0.70 | 5000 |
| Ex. 1-2 | A-2 | $CH_3$ | i-$C_5H_{11}$ | $C_{18}H_{37}$ | i-$C_8H_{17}$ | H | H | 1.00 | 0.70 | 28000 |
| Ex. 1-3 | A-3 | $CH_3$ | i-$C_5H_{11}$ | $C_{18}H_{37}$ | i-$C_8H_{17}$ | H | H | 1.00 | 0.60 | 28000 |
| Ex. 1-4 | A-4 | $CH_3$ | i-$C_5H_{11}$ | $C_{18}H_{37}$ | i-$C_8H_{17}$ | H | H | 1.00 | 0.50 | 28000 |
| Ex. 1-5 | A-5 | $CH_3$ | i-$C_5H_{11}$ | $C_{18}H_{37}$ | i-$C_8H_{17}$ | H | H | 1.00 | 0.80 | 28000 |
| Ex. 1-6 | A-6 | $CH_3$ | i-$C_5H_{11}$ | $C_{18}H_{37}$ | i-$C_8H_{17}$ | H | H | 1.00 | 0.90 | 28000 |

TABLE 1-continued

| | Dispersant | $R^1$ | $R^2$ | $R^3$ | $R^4$ | $R^5$ | M | b + c | b/b + c | Mw |
|---|---|---|---|---|---|---|---|---|---|---|
| Ex. 1-7 | A-7 | $CH_3$ | $i\text{-}C_5H_{11}$ | $C_{18}H_{37}$ | $i\text{-}C_8H_{17}$ | H | H | 0.80 | 0.75 | 28000 |
| Ex. 1-8 | A-8 | $CH_3$ | $i\text{-}C_5H_{11}$ | $C_{18}H_{37}$ | $i\text{-}C_8H_{17}$ | H | H | 0.60 | 0.83 | 28000 |
| Ex. 1-9 | A-9 | $CH_3$ | $i\text{-}C_5H_{11}$ | $C_{18}H_{37}$ | $t\text{-}C_4H_9$ | H | H | 1.00 | 0.70 | 28000 |
| Ex. 1-10 | A-10 | $CH_3$ | $i\text{-}C_5H_{11}$ | $C_{18}H_{37}$ | $C_2H_5$ | $C_2H_5$ | H | 1.00 | 0.70 | 28000 |
| Ex. 1-11 | A-11 | $CH_3$ | $i\text{-}C_5H_{11}$ | $C_{18}H_{37}$ | $C_4H_9$ | $C_4H_9$ | H | 1.00 | 0.70 | 28000 |
| Ex. 1-12 | A-12 | $CH_3$ | $i\text{-}C_5H_{11}$ | $C_{18}H_{37}$ | $c\text{-}C_6H_{13}$ | $c\text{-}C_6H_{13}$ | H | 1.00 | 0.70 | 28000 |
| Ex. 1-13 | A-13 | $CH_3$ | $i\text{-}C_5H_{11}$ | $C_{22}H_{45}$ | $i\text{-}C_8H_{17}$ | H | H | 1.00 | 0.70 | 28000 |
| Ex. 1-14 | A-14 | $CH_3$ | $i\text{-}C_5H_{11}$ | $C_{18}H_{37}$ | $C_8H_{17}$ | H | H | 1.00 | 0.70 | 28000 |
| Ex. 1-15 | A-15 | $CH_3$ | $i\text{-}C_5H_{11}$ | $C_{18}H_{37}$ | $C_4H_9$ | H | H | 1.00 | 0.70 | 28000 |
| Ex. 1-16 | A-16 | $CH_3$ | $i\text{-}C_5H_{11}$ | $C_{18}H_{37}$ | $i\text{-}C_4H_8OH$ | H | H | 1.00 | 0.70 | 28000 |
| Ex. 1-17 | A-19 | $CH_3$ | $i\text{-}C_5H_{11}$ | $C_{18}H_{37}$ | $i\text{-}C_8H_{17}$ | H | H | 1.00 | 0.70 | 9000 |
| Ex. 1-18 | A-20 | $CH_3$ | $i\text{-}C_5H_{11}$ | $C_{18}H_{37}$ | $i\text{-}C_8H_{17}$ | H | H | 1.00 | 0.70 | 6000 |
| Ex. 1-19 | A-21 | $CH_3$ | $CH_3$ | $C_{18}H_{37}$ | $i\text{-}C_8H_{17}$ | H | H | 1.00 | 0.80 | 60000 |
| Comp. Ex. 1-1 | A-17 | $CH_3$ | $i\text{-}C_5H_{11}$ | $C_{18}H_{37}$ | $i\text{-}C_8H_{17}$ | H | H | 1.00 | 0.30 | 28000 |
| Comp. Ex. 1-2 | A-18 | $CH_3$ | $i\text{-}C_5H_{11}$ | — | $i\text{-}C_8H_{17}$ | H | H | 1.00 | 0.00 | 28000 |

The solubility of each of the dispersants A-1 to A-21 in NMP at 25° C. was evaluated in accordance with the method described in the above [Solubility of dispersant in organic solvent]. Table 2 shows the results.

TABLE 2

| | Type of dispersant | Solubility in NMP at 25° C. |
|---|---|---|
| Ex. 1-1 | A-1 | B |
| Ex. 1-2 | A-2 | B |
| Ex. 1-3 | A-3 | B |
| Ex. 1-4 | A-4 | B |
| Ex. 1-5 | A-5 | B |
| Ex. 1-6 | A-6 | C |
| Ex. 1-7 | A-7 | B |
| Ex. 1-8 | A-8 | B |
| Ex. 1-9 | A-9 | B |
| Ex. 1-10 | A-10 | A |
| Ex. 1-11 | A-11 | A |
| Ex. 1-12 | A-12 | A |
| Ex. 1-13 | A-13 | B |
| Ex. 1-14 | A-14 | C |
| Ex. 1-15 | A-15 | B |
| Ex. 1-16 | A-16 | A |
| Ex. 1-17 | A-19 | B |
| Ex. 1-18 | A-20 | B |
| Ex. 1-19 | A-21 | B |
| Comp. Ex. 1-1 | A-17 | A |
| Comp. Ex. 1-2 | A-18 | A |

As shown in Table 2, the dispersants A-1 to A-16 and A-19 to A-21 in Examples have high solubility in the organic solvent (NMP). Thus, the dispersant compositions containing these dispersants in Examples have good handleability. In particular, the dispersants A-10 to A-12, which have been modified with a secondary amine compound, and the dispersant A-16 that contains a saturated hydrocarbon group having a hydroxyl group are highly soluble in the organic solvent at room temperature.

3. Preparation of Conductive Material Slurry

Example 2-1

First, 1.35 g of MW carbon nanotubes (manufactured by LG Chem, multi-walled carbon nanotube BT-1003M, average diameter: 12.5 nm, length: 10 to 70 μm (catalog values) as fibrous carbon nanostructures, the dispersant A-1 in Example 1-1, and 88.38 g of NMP were mixed to prepare a coarse dispersion containing 1.5 parts by mass of the MW carbon nanotubes (CNTs), 0.3 part by mass of the dispersant, and 98.2 parts by mass of NMP.

Then, the coarse dispersion was placed in a high-pressure homogenizer (manufactured by Beryu Corporation, product name: "BERYU MINI") equipped with a multi-stage pressure regulator (multi-stage step down transformer) for applying a back pressure during dispersion. The coarse dispersion was subjected to a dispersion treatment at a pressure of 120 MPa. Specifically, a shear force was applied to the coarse dispersion so that the MW carbon nanotubes were dispersed, while the back pressure was being applied. Thus, a conductive material slurry in Example 2-1 was prepared as a fibrous carbon nanostructure dispersion. The dispersion treatment was performed by circulating the dispersion in such a way that the dispersion was discharged from and injected back into the high pressure homogenizer. This circulation was repeated 20 times. The dispersion was discharged and injected at 45 g/min.

The viscosity of the conductive material slurry in Example 2-1 was 16 mPa·s at 25° C.

Examples 2-2 to 2-20, Comparative Examples 2-1, 2-2

Conductive material slurries in Examples 2-2 to 2-20 and conductive material slurries in Comparative Examples 2-1, 2-2 were prepared in the same manner as the preparation of the conductive material slurry in Example 2-1 by using the dispersants A-2 to A-16, A-19 to A-21, A-17, and A-18 instead of the dispersant A-1. The composition of each conductive material slurry is as shown in Table 3.

TABLE 3

| | Conductive material slurry | | | | | |
|---|---|---|---|---|---|---|
| | | Dispersant | | Organic solvent | Evaluation | |
| | CNT Part by mass | Type | Part by mass | Part by mass (with respect to CNT)[1] | (NMP) Parts by mass | Slurry viscosity (mPa · s) | Particle size of dispersed CNT (nm) |
| Ex. 2-1 | 1.5 | A-1 | 0.3 | 20 | 98.2 | 16 | 228 |
| Ex. 2-2 | 1.5 | A-2 | 0.3 | 20 | 98.2 | 10 | 197 |

TABLE 3-continued

| | | Conductive material slurry | | | | |
|---|---|---|---|---|---|---|
| | | Dispersant | | Organic solvent | Evaluation | |
| | CNT Part by mass | Type | Part by mass | Part by mass (with respect to CNT)[1] | (NMP) Parts by mass | Slurry viscosity (mPa·s) | Particle size of dispersed CNT (nm) |
| Ex. 2-3 | 1.5 | A-3 | 0.3 | 20 | 98.2 | 12 | 224 |
| Ex. 2-4 | 1.5 | A-4 | 0.3 | 20 | 98.2 | 63 | 216 |
| Ex. 2-5 | 1.5 | A-5 | 0.3 | 20 | 98.2 | 11 | 211 |
| Ex. 2-6 | 1.5 | A-6 | 0.3 | 20 | 98.2 | 11 | 224 |
| Ex. 2-7 | 1.5 | A-7 | 0.3 | 20 | 98.2 | 18 | 208 |
| Ex. 2-8 | 1.5 | A-8 | 0.3 | 20 | 98.2 | 159 | 452 |
| Ex. 2-9 | 1.5 | A-9 | 0.3 | 20 | 98.2 | 13 | 213 |
| Ex. 2-10 | 1.5 | A-10 | 0.3 | 20 | 98.2 | 8 | 203 |
| Ex. 2-11 | 1.5 | A-11 | 0.3 | 20 | 98.2 | 9 | 201 |
| Ex. 2-12 | 1.5 | A-12 | 0.3 | 20 | 98.2 | 13 | 207 |
| Ex. 2-13 | 1.5 | A-13 | 0.3 | 20 | 98.2 | 11 | 200 |
| Ex. 2-14 | 1.5 | A-14 | 0.3 | 20 | 98.2 | 10 | 205 |
| Ex. 2-15 | 1.5 | A-15 | 0.3 | 20 | 98.2 | 13 | 215 |
| Ex. 2-16 | 1.5 | A-16 | 0.3 | 20 | 98.2 | 7 | 210 |
| Ex. 2-17 | 1.5 | A-19 | 0.3 | 20 | 98.2 | 10 | 198 |
| Ex. 2-18 | 1.5 | A-20 | 0.3 | 20 | 98.2 | 11 | 219 |
| Ex. 2-19 | 1.5 | A-21 | 0.3 | 20 | 98.2 | 19 | 220 |
| Ex. 2-20 | 1.0 | A-2 | 0.5 | 20 | 98.5 | 5 | 188 |
| Comp. Ex. 2-1 | 1.5 | A-17 | 0.3 | 20 | 98.2 | 984 | 23200 |
| Comp. Ex. 2-2 | 1.5 | A-18 | 0.3 | 20 | 98.2 | 1271 | 23606 |

[1] The content (parts by mass) of the dispersant with respect to 100 parts by mass of CNTs in the conductive material slurry As shown in Table 3, the slurry viscosity is significantly lower in Examples using the dispersants A-1 to A-16 and A-19 to A-21 than in Comparative Examples 2-1, 2-2. Moreover, the CNTs dispersed in the conductive material slurries in Examples have a smaller particle size and better dispersibility than those dispersed in the conductive material slurries in Comparative Examples.

The dispersant A-17 used in the preparation of the conductive material slurry in Comparative Example 2-1 is a 100% modified product of the diisobutylene/maleic anhydride copolymer. However, since the mole fraction b of the constitutional unit II is small and b/b+c is less than 0.50, it is substantially impossible for the dispersant to be adsorbed on the CNTs. Consequently, the particle size of the dispersed CNTs is significantly increased, leading to a high slurry viscosity.

The dispersant A-18 used in the preparation of the conductive material slurry in Comparative Example 2-2 does not have a long chain alkyl group, and thus is highly soluble in the organic solvent even at room temperature (see Table 2). However, it is substantially impossible for the dispersant to be adsorbed on the CNTs. Consequently, the particle size of the dispersed CNTs is significantly increased, leading to a high slurry viscosity.

As can be seen from the results shown in Tables 2 and 3, the use of the dispersants A-1 to A-16 and A-19 to A-21 in Examples enables both good solubility of the dispersant in the organic solvent at room temperature and the preparation of the conductive material slurry containing the carbon material-based conductive materials with good dispersibility.

4. Preparation of Positive Electrode Paste

Example 3-1

First, 2.06 g of the conductive material slurry in Example 2-1, 1.03 g of NMP, and 1.9 g of an NMP solution of PVDF (8%) (KF polymer L #7208 manufactured by KUREHA CORPORATION) were weighed in a 50 ml sample bottle and stirred uniformly with a spatula. Then, this mixture was blended with 12 g of LiCoO$_2$ (CELLSEED manufactured by NIPPON CHEMICAL INDUSTRIAL CO., LTD.) as a positive electrode active material, and stirred again with a spatula until the mixture became homogeneous. The resulting mixture was further stirred with a rotation-revolution mixer (AR-100 manufactured by THINKY CORPORATION) for 5 minutes. Thus, a positive electrode paste in Example 3-1 was prepared.

The mass ratio of the positive electrode active material, the binder (PVDF), the conductive materials (carbon nanotubes), and the dispersant A-1 was 98.45:1.25:0.25:0.05 (in terms of solid content). The solid content (% by mass) of the positive electrode paste was 71.7% by mass. In this case, the total solid content of the positive electrode paste refers to the total mass of the dispersant, the positive electrode active material, the conductive materials, and the binder that are contained in the positive electrode paste.

Examples 3-2 to 3-20, Comparative Examples 3-1 to 3-2

Positive electrode pastes in Examples 3-2 to 3-20 and positive electrode pastes in Comparative Examples 3-1 to 3-2 were prepared in the same manner as the positive electrode paste in Example 3-1, except that the conductive material slurries in Examples 2-2 to 2-20 and the conductive material slurries in Comparative Examples 2-1 to 2-2 were used, respectively, instead of the conductive material slurry in Example 2-1.

Positive electrode coatings were produced, and the coating resistance of each of the positive electrode coatings was measured in accordance with the method described in the above [Measurement of resistance value of positive electrode coating]. Table 4 shows the results.

TABLE 4

|  | Type of dispersant | Coating resistance (Ω · cm) |
|---|---|---|
| Ex. 3-1 | A-1 | 45 |
| Ex. 3-2 | A-2 | 43 |
| Ex. 3-3 | A-3 | 178 |
| Ex. 3-4 | A-4 | 1510 |
| Ex. 3-5 | A-5 | 42 |
| Ex. 3-6 | A-6 | 35 |
| Ex. 3-7 | A-7 | 48 |
| Ex. 3-8 | A-8 | 449 |
| Ex. 3-9 | A-9 | 50 |
| Ex. 3-10 | A-10 | 36 |
| Ex. 3-11 | A-11 | 40 |
| Ex. 3-12 | A-12 | 45 |
| Ex. 3-13 | A-13 | 41 |
| Ex. 3-14 | A-14 | 48 |
| Ex. 3-15 | A-15 | 51 |
| Ex. 3-16 | A-16 | 44 |
| Ex. 3-17 | A-19 | 45 |
| Ex. 3-18 | A-20 | 47 |
| Ex. 3-19 | A-21 | 48 |
| Ex. 3-20 | A-2 | 39 |
| Comp. Ex. 3-1 | A-17 | 121350 |
| Comp. Ex. 3-2 | A-18 | 136460 |

As shown in Table 4, the coating resistance of each of the positive electrode coatings composed of the positive electrode pastes in Examples is significantly lower than that of the positive electrode coatings composed of the positive electrode pastes in Comparative Example 3-1, 3-2.

5. Preparation of Dispersant Composition (2)

Example 4-1

The dispersant A-11 and NMP were mixed to prepare a dispersant composition in Example 4-1, in which the content of the dispersant A-11 was 20.0% by mass.

Examples 4-2 to 4-9

The dispersant A-11, each of the organic amines B2 shown in Table 5, and an organic solvent were mixed in the proportions shown in Table 5 to prepare dispersant compositions in Examples 4-2 to 4-9.

TABLE 5

| | Dispersant composition | | | | | | |
|---|---|---|---|---|---|---|---|
| | Dispersant | | Organic amine B2 | | | | Organic solvent | |
| | Type | Mass (%) | Type | SP value [(cal/cm$^3$)$^{1/2}$] | Boiling point (° C.) | Mass (%) | Type | Mass (%) |
| Ex. 4-1 | A-11 | 20.0 | — | — | — | 0 | NMP | 80.0 |
| Ex. 4-2 | A-11 | 20.0 | 2-amino-2-methyl-1-propanol | 12.2 | 185 | 4.1 | NMP | 75.9 |
| Ex. 4-3 | A-11 | 20.0 | 2-amino-2-methyl-1-propanol | 12.2 | 185 | 10.0 | NMP | 70.0 |
| Ex. 4-4 | A-11 | 20.0 | 2-amino-2-methyl-1-propanol | 12.2 | 185 | 20.0 | NMP | 60.0 |
| Ex. 4-5 | A-11 | 20.0 | 2-N-dibutylaminoethanol | 10.0 | 226 | 20.0 | NMP | 60.0 |
| Ex. 4-6 | A-11 | 20.0 | 1-phenylmethanamine | 10.5 | 184 | 20.0 | NMP | 60.0 |
| Ex. 4-7 | A-11 | 20.0 | 2-dimethylaminoethanol | 11.3 | 134 | 20.0 | NMP | 60.0 |
| Ex. 4-8 | A-11 | 20.0 | N-methyl-2-aminoethanol | 12.5 | 175 | 20.0 | NMP | 60.0 |
| Ex. 4-9 | A-11 | 20.0 | N-ethyldiethanolamine | 13.4 | 251 | 20.0 | NMP | 60.0 |

6. Preparation of Conductive Material Slurry (2)

Examples 5-1 to 5-9

Conductive material slurries 5-1 to 5-9 were prepared in the same manner as the preparation of the conductive material slurry in Example 2-1 by using the dispersant compositions in Examples 4-1 to 4-9. The composition of each conductive material slurry is as shown in Table 6. Table 6 shows the results of measurement of the slurry viscosity and the particle size of the dispersed CNTs.

TABLE 6

| | Conductive material slurry | | | | | | | | | Evaluation | |
|---|---|---|---|---|---|---|---|---|---|---|---|
| | CNT | Dispersant | | | Organic amine B2 | | | Organic solvent | | Slurry | Particle size of |
| | Part by mass | Type | Part by mass | Part by mass (with respect to CNT)[2] | Type | Part by mass | Part by mass (with respect to CNT)[3] | Type | Part by mass[1] | viscosity (mPa · s) | dispersed CNT (nm) |
| Ex. 5-1 | 1.5 | A-11 | 0.30 | 20.0 | — | 0 | 0 | NMP | 98.20 | 9 | 201 |
| Ex. 5-2 | 1.5 | A-11 | 0.30 | 20.0 | 2-amino-2-methyl-1-propanol | 0.06 | 4.0 | NMP | 98.14 | 8 | 192 |
| Ex. 5-3 | 1.5 | A-11 | 0.30 | 20.0 | 2-amino-2-methyl-1-propanol | 0.15 | 10.0 | NMP | 98.05 | 7 | 188 |

TABLE 6-continued

| | Conductive material slurry | | | | | | | | | Evaluation | |
|---|---|---|---|---|---|---|---|---|---|---|---|
| | Dispersant | | | Organic amine B2 | | | | Organic solvent | | Slurry | Particle size of |
| | CNT | | Part by mass | | | Part by mass | | | | | |
| | Part by mass | Type | Part by mass | (with respect to CNT)[2] | Type | Part by mass | (with respect to CNT)[3] | Type | Part by mass[1] | viscosity (mPa · s) | dispersed CNT (nm) |
| Ex. 5-4 | 1.5 | A-11 | 0.30 | 20.0 | 2-amino-2-methyl-1-propanol | 0.30 | 20.0 | NMP | 97.90 | 6 | 186 |
| Ex. 5-5 | 1.5 | A-11 | 0.30 | 20.0 | 2-N-dibutylaminoethanol | 0.30 | 20.0 | NMP | 97.90 | 7 | 188 |
| Ex. 5-6 | 1.5 | A-11 | 0.30 | 20.0 | 1-phenylmethanamine | 0.30 | 20.0 | NMP | 97.90 | 8 | 190 |
| Ex. 5-7 | 1.5 | A-11 | 0.30 | 20.0 | 2-dimethylaminoethanol | 0.30 | 20.0 | NMP | 97.90 | 7 | 184 |
| Ex. 5-8 | 1.5 | A-11 | 0.30 | 20.0 | N-methyl-2-aminoethanol | 0.30 | 20.0 | NMP | 97.90 | 6 | 185 |
| Ex. 5-9 | 1.5 | A-11 | 0.30 | 20.0 | N-ethyldiethanolamine | 0.30 | 20.0 | NMP | 97.90 | 7 | 187 |

[1] The total amount of the organic solvent contained in the dispersant composition and the organic solvent added in the preparation of the conductive material slurry
[2] The amount of the dispersant with respect to 100 parts by mass of CNTs in the conductive material slurry
[3] The amount of the organic amine B2 with respect to 100 parts by mass of CNTs in the conductive material slurry As shown in Table 6, the conductive material slurries in Examples 5-1 to 5-9 containing the dispersant compositions in Examples 4-1 to 4-9 have a significantly low viscosity and achieve high dispersion of the CNTs with a very small particle size, compared to, e.g., the conductive material slurry in Comparative Example 2-2. Moreover, the slurry viscosity and the particle size of the dispersed CNTs are more reduced in the conductive material slurries in Examples 5-2 to 5-9 containing the organic amine B2 than in the conductive material slurry in Example 5-1 containing no organic amine B2.

7. Preparation of Positive Electrode for Power Storage Device

Example 6-1

First, 2.6 g of the conductive material slurry in Example 5-1, 0.24 g of acetylene black (Li-400 manufactured by Denka Company Limited, primary particle size: 48 nm, specific surface area: 39 m²/g (catalog values) as additional carbon material-based conductive materials, 0.04 g of an additional dispersant composition in Example 4-1, and 3.9 g of an NMIP solution of PVDF (KF polymer L #7208 manufactured by KUREHA CORPORATION, solid content: 8%, binder solution) were weighed in a 50 ml sample bottle and stirred uniformly with a spatula. Then, this mixture was blended with 15 g of LCO (lithium cobalt oxide, "GSL-5D" manufactured by Beijing Easpring Material Technology Co., Ltd.) as a positive electrode active material and 2.4 g of NMP as an additional solvent, and stirred again with a spatula until the mixture became homogenous. The resulting mixture was further stirred with a rotation-revolution mixer (AR-100 manufactured by THINKY CORPORATION) for 10 minutes. Thus, a positive electrode paste was prepared. The mass ratio of the positive electrode active material, the binder (PVDF), the conductive materials (carbon nanotubes), the additional conductive material (acetylene black), and the dispersant (dispersant A-11) was 96.2:1.95:0.25:1.5:0.1 (in terms of solid content). The solid content (% by mass) of the positive electrode paste was 65% by mass. In this case, the total solid content of the positive electrode paste refers to the total mass of the dispersant, the positive electrode active material, the conductive materials, and the binder that are contained in the positive electrode paste. Table 7 shows the content (effective content, mass %) of each component in the positive electrode paste thus prepared. This positive electrode paste was used to produce a power storage device. Table 8 shows the results of measurement of the direct current resistance (DCR) of the power storage device.

Examples 6-2 to 6-9

Positive electrode pastes in Examples 6-2 to 6-9 were prepared in the same manner as the positive electrode paste in Example 6-1, except that the conductive material slurry and the additional dispersant composition were changed as shown in Table 7. These positive electrode pastes were used to produce power storage devices. Table 8 shows the results of measurement of the direct current resistance (DCR) of the power storage devices.

TABLE 7

| | Positive electrode paste | | | | | | | | | | | |
|---|---|---|---|---|---|---|---|---|---|---|---|---|
| | Positive electrode active material (LCO) | | | Conductive material slurry | | | | Additional conductive material | Additional dispersant composition for electrode of power storage device | | Binder solution (PVDF 8% solution) | Additional solvent (NMP) |
| | | | | Content (mass %)[2] | | | | | | | | |
| | Content[2] (mass %) | Content in coating (mass %) | Type | Conductive material slurry | Conductive material (CNT) | Dispersant | Organic amine B2 | Content[2] (mass %) AB[1] | Type | Content[2] (mass %) | Content[2] (mass %) | Content[2] (mass %) |
| Ex. 6-1 | 62.10% | 96.20% | Ex. 5-1 | 10.77% | 0.162% | 0.032% | 0% | 0.99% | Ex. 4-1 | 0.2% | 16.0% | 9.94% |
| Ex. 6-2 | 62.10% | 96.20% | Ex. 5-2 | 10.77% | 0.162% | 0.032% | 0.007% | 0.99% | Ex. 4-2 | 0.2% | 16.0% | 9.94% |
| Ex. 6-3 | 62.10% | 96.20% | Ex. 5-3 | 10.77% | 0.162% | 0.032% | 0.016% | 0.99% | Ex. 4-3 | 0.2% | 16.0% | 9.94% |
| Ex. 6-4 | 62.10% | 96.20% | Ex. 5-4 | 10.77% | 0.162% | 0.032% | 0.032% | 0.99% | Ex. 4-4 | 0.2% | 16.0% | 9.94% |
| Ex. 6-5 | 62.10% | 96.20% | Ex. 5-5 | 10.77% | 0.162% | 0.032% | 0.032% | 0.99% | Ex. 4-5 | 0.2% | 16.0% | 9.94% |

TABLE 7-continued

Positive electrode paste

| | Positive electrode active material (LCO) | | Conductive material slurry | | | | Additional conductive material | Additional dispersant composition for electrode of power storage device | | Binder solution (PVDF 8% solution) | Additional solvent (NMP) |
|---|---|---|---|---|---|---|---|---|---|---|---|
| | | | | Content (mass %)[2] | | | | | | | |
| | Content[2] (mass %) | Content in coating (mass %) | Type | Conductive material slurry | Conductive material (CNT) | Dispersant | Organic amine B2 | Content[2] (mass %) AB[1] | Type | Content[2] (mass %) | Content[2] (mass %) | Content[2] (mass %) |
| Ex. 6-6 | 62.10% | 96.20% | Ex. 5-6 | 10.77% | 0.162% | 0.032% | 0.032% | 0.99% | Ex. 4-6 | 0.2% | 16.0% | 9.94% |
| Ex. 6-7 | 62.10% | 96.20% | Ex. 5-7 | 10.77% | 0.162% | 0.032% | 0.032% | 0.99% | Ex. 4-7 | 0.2% | 16.0% | 9.94% |
| Ex. 6-8 | 62.10% | 96.20% | Ex. 5-8 | 10.77% | 0.162% | 0.032% | 0.032% | 0.99% | Ex. 4-8 | 0.2% | 16.0% | 9.94% |
| Ex. 6-9 | 62.10% | 96.20% | Ex. 5-9 | 10.77% | 0.162% | 0.032% | 0.032% | 0.99% | Ex. 4-9 | 0.2% | 16.0% | 9.94% |

[1] Acetylene black
[2] The content in the positive electrode paste (mass %)

TABLE 8

| | Dispersant composition used in preparation of positive electrode | Positive electrode | | | | | | Evaluation of power storage device Direct current resistance ($\Omega$) |
|---|---|---|---|---|---|---|---|---|
| | | Physical property value of organic amine B2 in dispersant composition | | Content of positive active material (mass %) | Content of conductive material D (mass %) | | Content of binder (mass %) | Content of dispersant (mass %) |
| | | SP value [(cal/cm$^3$)$^{1/2}$] | Boiling point (° C.) | | CNT | AB[1] | | | |
| Ex. 6-1 | Ex. 4-1 | — | — | 96.2 | 0.25 | 1.5 | 1.95 | 0.1 | 12.80 |
| Ex. 6-2 | Ex. 4-2 | 12.2 | 185 | 96.2 | 0.25 | 1.5 | 1.95 | 0.1 | 12.72 |
| Ex. 6-3 | Ex. 4-3 | 12.2 | 185 | 96.2 | 0.25 | 1.5 | 1.95 | 0.1 | 12.22 |
| Ex. 6-4 | Ex. 4-4 | 12.2 | 185 | 96.2 | 0.25 | 1.5 | 1.95 | 0.1 | 11.85 |
| Ex. 6-5 | Ex. 4-5 | 10.0 | 226 | 96.2 | 0.25 | 1.5 | 1.95 | 0.1 | 12.38 |
| Ex. 6-6 | Ex. 4-6 | 10.5 | 184 | 96.2 | 0.25 | 1.5 | 1.95 | 0.1 | 12.34 |
| Ex. 6-7 | Ex. 4-7 | 11.3 | 134 | 96.2 | 0.25 | 1.5 | 1.95 | 0.1 | 11.99 |
| Ex. 6-8 | Ex. 4-8 | 12.5 | 175 | 96.2 | 0.25 | 1.5 | 1.95 | 0.1 | 12.18 |
| Ex. 6-9 | Ex. 4-9 | 13.4 | 251 | 96.2 | 0.25 | 1.5 | 1.95 | 0.1 | 12.42 |

[1] Acetylene black

As shown in Table 8, the power storage devices including the positive electrode coatings composed of the positive electrode pastes in Examples 6-2 to 6-9, each of which was prepared by using the dispersant compositions in Examples 4-2 to 4-9, have lower direct current resistance than the power storage device including the positive electrode coating composed of the positive electrode paste in Example 6-1, which was prepared by using the dispersant composition in Example 4-1. The results confirm that the presence of the organic amine B2 in the positive electrode paste can provide a power storage device with lower resistance.

INDUSTRIAL APPLICABILITY

The dispersant of the present disclosure is highly soluble in the organic solvent at room temperature, and thus can provide the dispersant composition with good handleability. Therefore, the use of the dispersant of the present disclosure can prepare a dispersant composition for an electrode of a power storage device, a conductive material slurry, and a positive electrode paste with high productivity. Moreover, the use of the dispersant of the present disclosure can produce a low resistance positive electrode for a power storage device and a low resistance power storage device with high productivity.

The invention claimed is:
1. A dispersant for an electrode of a power storage device, comprising:
a repeating unit represented by the following general formula (1), where a, b, and c each represent a mole fraction, provided that a+b+c=1, and b and c satisfy the relationship expressed by 0.50<b+c≤1.00 and 0.50≤b/(b+c)≤0.95:

[Chemical Formula 1]

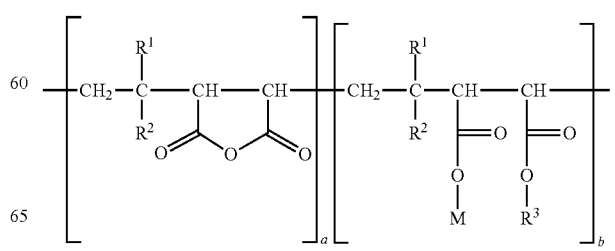

(1)

-continued

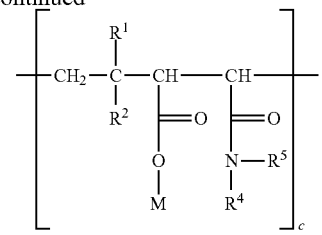

in the general formula (1), $R^1$ represents hydrogen or a methyl group, $R^2$ represents hydrogen, an alkyl group with 1 to 10 carbon atoms, or an aromatic hydrocarbon group having a substituent with 1 to 10 carbon atoms or having no substituent, $R^3$ represents an alkyl group with 16 to 22 carbon atoms, M represents hydrogen, $NH_4$, a metal that gives a salt soluble in an organic solvent, or organic ammonium soluble in an organic solvent, $R^4$ represents an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group, and $R^5$ represents hydrogen, an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group.

2. The dispersant according to claim 1, wherein $R^4$ represents a branched alkyl group.

3. The dispersant according to claim 1, wherein $R^5$ represents an alkyl group with 1 to 12 carbon atoms, a saturated hydrocarbon group with 1 to 12 carbon atoms that includes an alicyclic hydrocarbon group, or a saturated hydrocarbon group with 1 to 12 carbon atoms that has a hydroxyl group.

4. A dispersant composition for an electrode of a power storage device, comprising:
the dispersant according to claim 1; and
an organic solvent.

5. The dispersant composition according to claim 4, further comprising one or more than one type of organic amine B2 that is soluble in the organic solvent and has an SP value of 9.5 $(cal/cm^3)^{1/2}$ or more and 14 $(cal/cm^3)^{1/2}$ or less.

6. The dispersant composition according to claim 5, wherein the organic amine B2 has a boiling point of 260° C. or less.

7. The dispersant composition according to claim 5, wherein a content of the organic amine B2 is 10 parts by mass or more and 300 parts by mass or less with respect to 100 parts by mass of a content of the dispersant.

8. The dispersant composition according to claim 4, wherein a content of the dispersant is 10% by mass or more and 50% by mass or less.

9. The dispersant composition according to claim 4, wherein the organic solvent contains at least one selected from the group consisting of amide-based polar organic solvents, ketone-based polar organic solvents, and ester-based polar organic solvents.

10. The dispersant according to claim 1, wherein M represents hydrogen, $NH_4$, alkali metal, or organic ammonium soluble in the organic solvent.

11. A carbon material-based conductive material slurry comprising:
the dispersant according to claim 1;
carbon material-based conductive materials; and
an organic solvent.

12. The carbon material-based conductive material slurry according to claim 11, wherein the carbon material-based conductive materials include at least one selected from the group consisting of carbon black and carbon nanotubes.

13. A positive electrode paste for a power storage device, comprising:
the dispersant according to claim 1;
carbon material-based conductive materials;
a positive electrode active material; and
an organic solvent.

14. A method for producing a positive electrode for a power storage device by using the positive electrode paste according to claim 13.

15. A method for producing a power storage device by using a positive electrode for a power storage device that is produced by the method according to claim 14.

* * * * *